(12) United States Patent
Krishnan et al.

(10) Patent No.: US 9,762,355 B2
(45) Date of Patent: Sep. 12, 2017

(54) SYSTEM AND METHOD OF REDUNDANCY BASED PACKET TRANSMISSION ERROR RECOVERY

(71) Applicant: QUALCOMM Incorporated, San Diego, CA (US)

(72) Inventors: Venkatesh Krishnan, San Diego, CA (US); Vivek Rajendran, San Diego, CA (US); Sandip Sarkar, San Diego, CA (US); Subasingha Shaminda Subasingha, San Diego, CA (US); Venkatraman S. Atti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 14/809,098

(22) Filed: Jul. 24, 2015

(65) Prior Publication Data

US 2016/0036564 A1    Feb. 4, 2016

Related U.S. Application Data

(60) Provisional application No. 62/031,675, filed on Jul. 31, 2014.

(51) Int. Cl.
  *H03M 13/00*    (2006.01)
  *H04L 1/08*    (2006.01)
  (Continued)

(52) U.S. Cl.
  CPC .............. *H04L 1/08* (2013.01); *H04L 1/008* (2013.01); *H04L 1/0041* (2013.01);
  (Continued)

(58) Field of Classification Search
  CPC ...... H04L 1/008; H04L 1/1812; H04L 1/0041; H04L 1/0045; H04L 1/08; H04L 1/1835
  See application file for complete search history.

(56) References Cited

U.S. PATENT DOCUMENTS 6,167,438 A * 12/2000 Yates ................ G06F 17/30902
                                                    707/E17.12
6,956,855 B1 * 10/2005 Chang .................. H04L 1/1621
                                                    370/252

(Continued)

FOREIGN PATENT DOCUMENTS

EP          2645612 A2   10/2013
WO       2009120825 A1   10/2009

OTHER PUBLICATIONS

International Search Report and Written Opinion for International Application No. PCT/US2015/042314, ISA/EPO, dated Oct. 12, 2015, 13 pages.

(Continued)

*Primary Examiner* — Guy Lamarre
(74) *Attorney, Agent, or Firm* — Toler Law Group, P.C.

(57) ABSTRACT

A device includes a receiver, a buffer, a transmitter, and an analyzer. The receiver is configured to receive a plurality of packets that corresponds to at least a subset of a sequence of packets. Error correction data of a first packet of the plurality of packets includes a partial copy of a second packet of the plurality of packets. The analyzer is configured to determine whether a particular packet of the sequence is missing from the buffer, and to determine whether a partial copy of the particular packet is stored in the buffer. The analyzer is also configured to send, via the transmitter, a retransmit message to a second device based at least in part on determining that the buffer does not store the particular packet and that the buffer does not store the partial copy of the particular packet.

27 Claims, 9 Drawing Sheets

(51) Int. Cl.
    *H04L 1/00*                (2006.01)
    *H04L 1/18*                (2006.01)

(52) U.S. Cl.
    CPC .......... *H04L 1/0045* (2013.01); *H04L 1/1835* (2013.01); *H04L 1/1812* (2013.01)

(56) References Cited

U.S. PATENT DOCUMENTS

| | | |
|---|---|---|
| 6,990,112 B1 | 1/2006 | Brent et al. |
| 7,979,768 B2 | 7/2011 | Sammour et al. |
| 8,943,393 B1* | 1/2015 | Mendel ................ H04L 1/0072 714/807 |
| 2003/0043749 A1* | 3/2003 | Tanaka ................ H03M 13/00 370/241 |
| 2004/0100977 A1* | 5/2004 | Suzuki ................ H04L 45/7453 370/401 |
| 2006/0007943 A1* | 1/2006 | Fellman ................ H04L 1/0045 370/400 |
| 2006/0203729 A1 | 9/2006 | Deshpande |
| 2011/0066912 A1* | 3/2011 | Riess ................ H04L 1/1812 714/751 |
| 2012/0327761 A1 | 12/2012 | Obuchi et al. |
| 2013/0185062 A1 | 7/2013 | Krishnan et al. |
| 2014/0064065 A1 | 3/2014 | Rogers et al. |
| 2016/0036560 A1 | 2/2016 | Krishnan et al. |

OTHER PUBLICATIONS

Universal Mobile Telecommunications System (UMTS); LTE; Codec for Enhanced Voice Services (EVS); Jitter buffer management (3GPP TS 26.448 version 12.1.0 Release 12). ETSI TS 126 448 V12.1.0 (Jan. 2015), 24 pgs.

* cited by examiner

SYSTEM AND METHOD OF REDUNDANCY BASED PACKET TRANSMISSION ERROR RECOVERY

I. CROSS-REFERENCE TO RELATED APPLICATIONS

The present application claims priority from U.S. Provisional Patent Application No. 62/031,675, filed Jul. 31, 2014, which is entitled "SYSTEM AND METHOD OF REDUNDANCY BASED PACKET TRANSMISSION ERROR RECOVERY," the content of which is incorporated by reference in its entirety.

II. FIELD

The present disclosure is generally related to redundancy based packet transmission error recovery.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, may communicate voice and data packets over wireless networks. Further, many such wireless telephones include other types of devices that are incorporated therein. For example, a wireless telephone may also include a digital still camera, a digital video camera, a digital recorder, and an audio file player. Also, such wireless telephones may process executable instructions, including software applications, such as a web browser application, that may be used to access the Internet. As such, these wireless telephones may include significant computing capabilities.

Transmission of voice by digital techniques is widespread, particularly in long distance and digital radio telephone applications. There may be an interest in determining the least amount of information that can be sent over a channel while maintaining a perceived quality of reconstructed speech. If speech is transmitted by sampling and digitizing, a data rate on the order of sixty-four kilobits per second (kbps) may be used to achieve a speech quality of an analog telephone. Through the use of speech analysis, followed by coding, transmission, and re-synthesis at a receiver, a significant reduction in the data rate may be achieved.

Devices for compressing speech may find use in many fields of telecommunications. An exemplary field is wireless communications. The field of wireless communications has many applications including, e.g., cordless telephones, paging, wireless local loops, wireless telephony such as cellular and personal communication service (PCS) telephone systems, mobile Internet Protocol (IP) telephony, and satellite communication systems. A particular application is wireless telephony for mobile subscribers.

Various over-the-air interfaces have been developed for wireless communication systems including, e.g., frequency division multiple access (FDMA), time division multiple access (TDMA), code division multiple access (CDMA), and time division-synchronous CDMA (TD-SCDMA). In connection therewith, various domestic and international standards have been established including, e.g., Advanced Mobile Phone Service (AMPS), Global System for Mobile Communications (GSM), and Interim Standard 95 (IS-95). An exemplary wireless telephony communication system is a code division multiple access (CDMA) system. The IS-95 standard and its derivatives, IS-95A, ANSI J-STD-008, and IS-95B (referred to collectively herein as IS-95), are promulgated by the Telecommunication Industry Association (TIA) and other well-known standards bodies to specify the use of a CDMA over-the-air interface for cellular or PCS telephony communication systems.

The IS-95 standard subsequently evolved into "3G" systems, such as cdma2000 and WCDMA, which provide more capacity and high speed packet data services. Two variations of cdma2000 are presented by the documents IS-2000 (cdma2000 1×RTT) and IS-856 (cdma2000 1×EV-DO), which are issued by TIA. The cdma2000 1×RTT communication system offers a peak data rate of 153 kbps whereas the cdma2000 1×EV-DO communication system defines a set of data rates, ranging from 38.4 kbps to 2.4 Mbps. The WCDMA standard is embodied in 3rd Generation Partnership Project "3GPP", Document Nos. 3G TS 25.211, 3G TS 25.212, 3G TS 25.213, and 3G TS 25.214. The International Mobile Telecommunications Advanced (IMT-Advanced) specification sets out "4G" standards. The IMT-Advanced specification sets peak data rate for 4G service at 100 megabits per second (Mbit/s) for high mobility communication (e.g., from trains and cars) and 1 gigabit per second (Gbit/s) for low mobility communication (e.g., from pedestrians and stationary users).

Devices that employ techniques to compress speech by extracting parameters that relate to a model of human speech generation are called speech coders. Speech coders may comprise an encoder and a decoder. The encoder divides the incoming speech signal into blocks of time, or analysis frames. The duration of each segment in time (or "frame") may be selected to be short enough that the spectral envelope of the signal may be expected to remain relatively stationary. For example, one frame length is twenty milliseconds, which corresponds to 160 samples at a sampling rate of eight kilohertz (kHz), although any frame length or sampling rate deemed suitable for the particular application may be used.

The encoder analyzes the incoming speech frame to extract certain relevant parameters, and then quantizes the parameters into binary representation, e.g., to a set of bits or a binary data packet. The data packets are transmitted over a communication channel (i.e., a wired and/or wireless network connection) to a receiver and a decoder. The decoder processes the data packets, unquantizes the processed data packets to produce the parameters, and resynthesizes the speech frames using the unquantized parameters.

The function of the speech coder is to compress the digitized speech signal into a low-bit-rate signal by removing natural redundancies inherent in speech. The digital compression may be achieved by representing an input speech frame with a set of parameters and employing quantization to represent the parameters with a set of bits. If the input speech frame has a number of bits $N_i$ and a data packet produced by the speech coder has a number of bits $N_o$, the compression factor achieved by the speech coder is $C_r = N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

Speech coders generally utilize a set of parameters (including vectors) to describe the speech signal. A good set of parameters ideally provides a low system bandwidth for the reconstruction of a perceptually accurate speech signal. Pitch, signal power, spectral envelope (or formants), amplitude and phase spectra are examples of the speech coding parameters.

Speech coders may be implemented as time-domain coders, which attempt to capture the time-domain speech waveform by employing high time-resolution processing to encode small segments of speech (e.g., 5 millisecond (ms) sub-frames) at a time. For each sub-frame, a high-precision representative from a codebook space is found by means of a search algorithm. Alternatively, speech coders may be implemented as frequency-domain coders, which attempt to capture the short-term speech spectrum of the input speech frame with a set of parameters (analysis) and employ a corresponding synthesis process to recreate the speech waveform from the spectral parameters. The parameter quantizer preserves the parameters by representing them with stored representations of code vectors in accordance with known quantization techniques.

One time-domain speech coder is the Code Excited Linear Predictive (CELP) coder. In a CELP coder, the short-term correlations, or redundancies, in the speech signal are removed by a linear prediction (LP) analysis, which finds the coefficients of a short-term formant filter. Applying the short-term prediction filter to the incoming speech frame generates an LP residue signal, which is further modeled and quantized with long-term prediction filter parameters and a subsequent stochastic codebook. Thus, CELP coding divides the task of encoding the time-domain speech waveform into the separate tasks of encoding the LP short-term filter coefficients and encoding the LP residue. Time-domain coding can be performed at a fixed rate (i.e., using the same number of bits, $N_o$, for each frame) or at a variable rate (in which different bit rates are used for different types of frame contents). Variable-rate coders attempt to use the amount of bits needed to encode the codec parameters to a level adequate to obtain a target quality.

Time-domain coders such as the CELP coder may rely upon a high number of bits, $N_o$, per frame to preserve the accuracy of the time-domain speech waveform. Such coders may deliver excellent voice quality provided that the number of bits, $N_o$, per frame is relatively large (e.g., 8 kbps or above). At low bit rates (e.g., 4 kbps and below), time-domain coders may fail to retain high quality and robust performance due to the limited number of available bits. At low bit rates, the limited codebook space clips the waveform-matching capability of time-domain coders, which are deployed in higher-rate commercial applications. Hence, despite improvements over time, many CELP coding systems operating at low bit rates suffer from perceptually significant distortion characterized as noise.

An alternative to CELP coders at low bit rates is the "Noise Excited Linear Predictive" (NELP) coder, which operates under similar principles as a CELP coder. NELP coders use a filtered pseudo-random noise signal to model speech, rather than a codebook. Since NELP uses a simpler model for coded speech, NELP achieves a lower bit rate than CELP. NELP may be used for compressing or representing unvoiced speech or silence.

Coding systems that operate at rates on the order of 2.4 kbps are generally parametric in nature. That is, such coding systems operate by transmitting parameters describing the pitch-period and the spectral envelope (or formants) of the speech signal at regular intervals. Illustrative of these so-called parametric coders is the LP vocoder system.

LP vocoders model a voiced speech signal with a single pulse per pitch period. This basic technique may be augmented to include transmission information about the spectral envelope, among other things. Although LP vocoders provide reasonable performance generally, they may introduce perceptually significant distortion, characterized as buzz.

In recent years, coders have emerged that are hybrids of both waveform coders and parametric coders. Illustrative of these so-called hybrid coders is the prototype-waveform interpolation (PWI) speech coding system. The PWI coding system may also be known as a prototype pitch period (PPP) speech coder. A PWI coding system provides an efficient method for coding voiced speech. The basic concept of PWI is to extract a representative pitch cycle (the prototype waveform) at fixed intervals, to transmit its description, and to reconstruct the speech signal by interpolating between the prototype waveforms. The PWI method may operate either on the LP residual signal or the speech signal.

Electronic devices, such as wireless telephones, may send and receive data via networks. For example, audio data may be sent and received via a circuit-switched network (e.g., the public switched telephone network (PSTN), a global system for mobile communications (GSM) network, etc.) or a packet-switched network (e.g., a voice over internet protocol (VoIP) network, a voice over long term evolution (VoLTE) network, etc.). In a packet-switched network, audio packets may be individually routed from a source device to a destination device. Due to network conditions, the audio packets may arrive out of order. The destination device may store received packets in a de jitter buffer and may rearrange the received packets if the received packets are out-of-order.

The destination device may reconstruct data based on the received packets. A particular packet sent by the source device may not be received, or may be received with errors, by a destination device. The destination device may be unable to recover all or a portion of the data associated with the particular packet. The destination device may reconstruct the data based on incomplete packets. The data reconstructed based on incomplete packets may have degraded quality that adversely impacts a user experience. Alternatively, the destination device may request the source device to retransmit the particular packet and may delay reconstructing the data while waiting to receive a retransmitted packet. The delay associated with requesting retransmission and reconstructing the data based on a retransmitted packet may be perceptible to a user and may result in a negative user experience.

IV. SUMMARY

In a particular aspect, a device includes a receiver, a buffer, a transmitter, and an analyzer. The receiver is configured to receive a plurality of packets. The plurality of packets corresponds to at least a subset of a sequence of packets. The plurality of packets includes error correction data. The error correction data of a first packet of the plurality of packets includes a partial copy of a second packet of the plurality of packets. The buffer is configured to store the plurality of packets. The analyzer is configured to determine whether a particular packet of the sequence of packets is missing from the buffer, and to determine whether a partial copy of the particular packet is stored in the buffer as error correction data in another packet. The analyzer is also configured to send, via the transmitter, a retransmit message to a second device based at least in part on determining that the buffer does not store the particular packet and that the buffer does not store the partial copy of the particular packet.

In another particular aspect, a method of communication includes receiving a plurality of packets at a device, the plurality of packets corresponding to at least a subset of a sequence of packets. The plurality of packets includes error correction data. The error correction data of a first packet of the plurality of packets includes a partial copy of a second packet of the plurality of packets. The method also includes determining, at the device, whether a particular packet of the sequence of packets is missing from a buffer. The method further includes determining, at the device, whether a partial copy of the particular packet is stored in the buffer as error correction data in another packet. The method also includes sending a retransmit message from the device to a second device based at least in part on determining that the buffer does not store the particular packet and that the buffer does not store the partial copy of the particular packet.

In another particular aspect, a computer-readable storage device stores instructions that, when executed by a processor, cause the processor to perform operations including receiving a plurality of packets. The plurality of packets corresponds to at least a subset of a sequence of packets. The plurality of packets includes error correction data. The error correction data of a first packet of the plurality of packets includes a partial copy of a second packet of the plurality of packets. The operations also include determining whether a particular packet of the sequence of packets is missing from a buffer. The operations further include determining whether a partial copy of the particular packet is stored in the buffer as error correction data in another packet. The operations also include sending a retransmit message to a device based at least in part on determining that the buffer does not store the particular packet and that the buffer does not store the partial copy of the particular packet.

Other aspects, advantages, and features of the present disclosure will become apparent after review of the application, including the following sections: Brief Description of the Drawings, Detailed Description, and the Claims.

V. BRIEF DESCRIPTION OF THE DRAWINGS

VI. DETAILED DESCRIPTION

Figure 1:
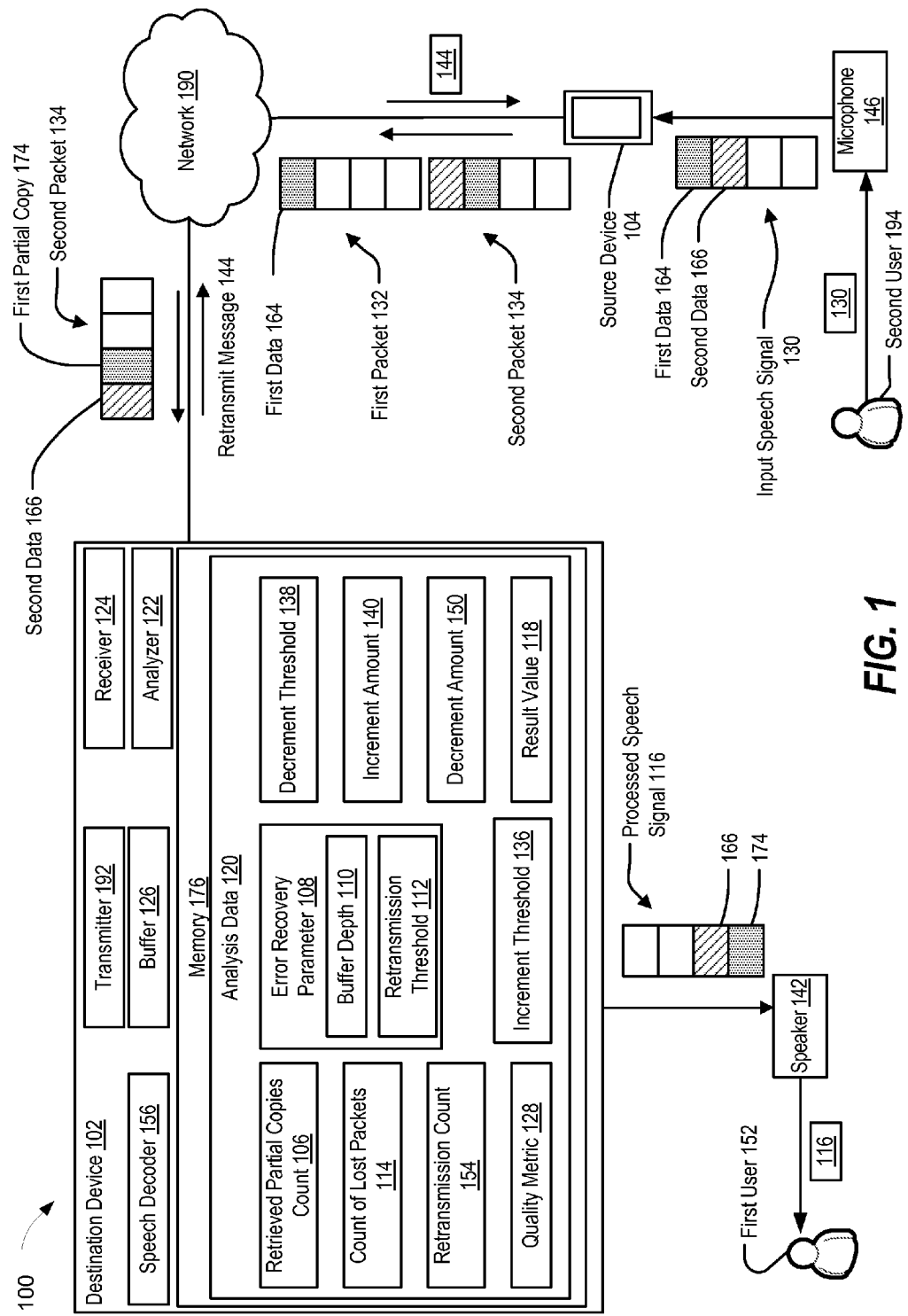
FIG. 1 is a block diagram of a particular illustrative aspect of a system that is operable to perform redundancy based packet transmission error recovery.

The principles described herein may be applied, for example, to a headset, a handset, other audio device, or a component of a device that is configured to perform redundancy based packet transmission error recovery. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, it is well understood by a person having ordinary skill in the art, that there may be other blocks or components between the structures being "coupled".

The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to one or more frames. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include cellular phones, personal digital assistants (PDAs), handheld devices, headsets, wireless modems, laptop computers, personal computers, etc.

Referring to FIG. 1, a particular illustrative aspect of a system operable to perform redundancy based error recovery is disclosed and generally designated 100. The system 100 may include a destination device 102 in communication with one or more other devices (e.g., a source device 104) via a network 190. The source device 104 may include or may be coupled to a microphone 146. The destination device 102 may include or may be coupled to a speaker 142. The destination device 102 may include an analyzer 122 coupled to, or in communication with, a memory 176. The destination device 102 may include a receiver 124, a transmitter 192, a buffer 126, a speech decoder 156, or a combination thereof. The memory 176 may be configured to store analysis data 120. The analysis data 120 may include a retrieved partial copies count 106, a count of lost packets 114, a retransmission count 154, a quality metric 128, an increment threshold 136, a decrement threshold 138, an increment amount 140, a decrement amount 150, a result value 118, an error recovery parameter 108, or a combination thereof. The error recovery parameter 108 may include a buffer depth 110, a retransmission threshold 112, or both.

The destination device 102 may include fewer or more components than illustrated in FIG. 1. For example, the destination device 102 may include one or more processors, one or more memory units, or both. The destination device 102 may include a networked or a distributed computing system. For example, the memory 176 may be a networked or a distributed memory. In a particular illustrative aspect, the destination device 102 may include a communication device, a decoder, a smart phone, a cellular phone, a mobile communication device, a laptop computer, a computer, a tablet, a personal digital assistant (PDA), a set top box, a video player, an entertainment unit, a display device, a television, a gaming console, a music player, a radio, a digital video player, a digital video disc (DVD) player, a tuner, a camera, a navigation device, or a combination thereof. Such devices may include a user interface (e.g., a touch screen, voice recognition capability, or other user interface capabilities).

During operation, a first user 152 may be engaged in a voice call with a second user 194. The first user 152 may use the destination device 102 and the second user 194 may use the source device 104 for the voice call. During the voice call, the second user 194 may speak into the microphone 146 associated with the source device 104. An input speech signal 130 may correspond to a portion of a word, a word, or multiple words spoken by the second user 194. For example, the input speech signal 130 may include first data 164 and second data 166. The source device 104 may receive the input speech signal 130, via the microphone 146, from the second user 194. In a particular aspect, the microphone 146 may capture an audio signal and an analog-to-digital converter (ADC) may convert the captured audio signal from an analog waveform into a digital waveform comprised of digital audio samples. The digital audio samples may be processed by a digital signal processor. A gain adjuster may adjust a gain (e.g., of the analog waveform or the digital waveform) by increasing or decreasing an amplitude level of an audio signal (e.g., the analog waveform or the digital waveform). Gain adjusters may operate in either the analog or digital domain. For example, a gain adjuster may operate in the digital domain and may adjust the digital audio samples produced by the analog-to-digital converter. After gain adjusting, an echo canceller may reduce echo that may have been created by an output of a speaker entering the microphone 146. The digital audio samples may be "compressed" by a vocoder (a voice encoder-decoder). The output of the echo canceller may be coupled to vocoder pre-processing blocks, e.g., filters, noise processors, rate converters, etc. An encoder of the vocoder may compress the digital audio samples and form a sequence of packets (e.g., a first packet 132 and a second packet 134). Each of the sequence of packets may include a representation of the compressed bits of the digital audio samples. For example, the first packet 132 may be earlier in the sequence of packets than the second packet 134. To illustrate, the first packet 132 may include the first data 164 corresponding to a particular audio frame (e.g., an audio frame N) and the second packet 134 may include the second data 166 corresponding to a subsequent audio frame (e.g., an audio frame N+2).

In a particular aspect, a subsequent packet (e.g., the second packet 134) may also include redundant data (e.g., a partial copy of the first packet 132) that may be used to reconstruct a previous audio frame (e.g., the audio frame N). For example, the second packet 134 may include a first partial copy 174 corresponding to at least a portion of the first data 164. In a particular aspect, the redundant data (e.g., the first partial copy 174) may correspond to a "critical" speech frame. For example, a loss of the critical speech frame may cause a user-perceptible degradation in audio quality of a processed speech signal generated at the destination device 102.

In a particular aspect, the source device 104 and the destination device 102 may operate on a constant-bit-rate (e.g., 13.2 kilobit per second (kbps)) channel. In this aspect, a primary frame bit-rate corresponding to primary data (e.g., the second data 166) may be reduced (e.g., to 9.6 kbps) to accommodate the redundant data (e.g., the first partial copy 174). For example, a remaining bit-rate (e.g., 3.6 kbps) of the constant-bit-rate may correspond to the redundant data. In a particular aspect, the reduction of the primary frame bit-rate may be performed at the source device 104 depending on characteristics of the input speech signal 130 to have reduced impact on overall speech quality.

The sequence of packets (e.g., the packets 132 and 134) may be stored in a memory that may be shared with a processor of the source device 104. The processor may be a control processor that is in communication with a digital signal processor.

The source device 104 may transmit the sequence of packets (e.g., the first packet 132, the second packet 134, or both) to the destination device 102 via the network 190. For example, the source device 104 may include a transceiver. The transceiver may modulate some form of the sequence of packets (e.g., other information may be appended to the packets 132 and 134). The transceiver may send the modulated information over the air via an antenna.

The analyzer 122 of the destination device 102 may receive one or more packets (e.g., the first packet 132, the second packet 134, or both) of the sequence of packets. For example, an antenna of the destination device 102 may receive some form of incoming packets that include the first packet 132, the second packet 134, or both. The first packet 132, the second packet 134, or both, may be "uncompressed" by a decoder of a vocoder at the destination device 102. The uncompressed waveform may be referred to as reconstructed audio samples. The reconstructed audio samples may be post-processed by vocoder post-processing blocks and an echo canceller may remove echo based on the reconstructed audio samples. For the sake of clarity, the decoder of the vocoder and the vocoder post-processing blocks may be referred to as a vocoder decoder module. In some configurations, an output of the echo canceller may be processed by the analyzer 122. Alternatively, in other configurations, the output of the vocoder decoder module may be processed by the analyzer 122.

The analyzer 122 may store the packets (e.g., the first packet 132, the second packet 134, or both) received by the destination device 102 in the buffer 126 (e.g., a de-jitter buffer). In a particular aspect, the packets may be received out-of-order at the destination device 102. The analyzer 122 may reorder one or more packets in the buffer 126 if the packets are out-of-order. One or more packets of the sequence of packets sent by the source device 104 may not be received, or may be received with errors, by the destination device 102. For example, a packet (e.g., the first packet 132) may not be received due to packet loss or may be partially received, due to network conditions, by the receiver 124.

The analyzer 122 may determine whether a particular packet of the sequence of packets is missing from the buffer 126. For example, each packet in the buffer 126 may include a sequence number. The analyzer 122 may maintain a counter (e.g., a next sequence number) in the analysis data 120. For example, the next sequence number may have a starting value (e.g., 0). The analyzer 122 may update (e.g., increment by 1) the next sequence number after processing each packet corresponding to a particular input signal (e.g., the input speech signal 130). The analyzer 122 may reset the next sequence number to the starting value after processing a last packet corresponding to the particular input signal (e.g., the input speech signal 130).

The analyzer 122 may determine that the buffer 126 includes a next packet (e.g., the first packet 132) having the next sequence number. The analyzer 122 may generate a processed speech signal based on at least the next packet (e.g., the first packet 132). In a particular aspect, the analyzer 122 may provide the first packet 132 to the speech decoder 156 and the speech decoder 156 may generate the processed speech signal. The analyzer 122 (or the speech decoder 156) may generate the processed speech signal based on the first packet 132 and the second packet 134. The processed speech signal may correspond to the first data 164 of the first packet 132 and the second data 166 of the second packet 134. The analyzer 122 (or the speech decoder 156) may output the processed speech signal via the speaker 142 to the first user 152. The analyzer 122 may update (e.g., increment or reset) the next sequence number.

The analyzer 122 may determine whether a particular packet (e.g., the first packet 132) of the sequence of packets sent by the source device 104 is missing from the buffer 126. For example, the analyzer 122 may determine that the first packet 132 is missing based on determining that the buffer 126 does not store a next packet (e.g., the first packet 132) having the next sequence number. To illustrate, the analyzer 122 may determine that the first packet 132 is missing in response to determining that a packet (e.g., the first packet 132) corresponding to the next sequence number is not found in the buffer 126. The analyzer 122 may determine whether a partial copy of the first packet 132 is stored in the buffer 126 as error correction data in another packet (e.g., the second packet 134) stored in the buffer 126. For example, one or more fields in a header of each packet may indicate whether the packet includes error correction data and may indicate a corresponding packet. The analyzer 122 may examine the particular field of one or more packets (e.g., the second packet 134) stored in the buffer 126. For example, the buffer 126 may store the second packet 134. A particular field in the header of the second packet 134 may indicate that the second packet 134 includes error correction data corresponding to the first packet 132. For example, the particular field may indicate a sequence number of the first packet 132. The analyzer 122 may determine that the partial copy of the first packet 132 is stored in the buffer 126 based on determining that the particular field of the second packet 134 indicates the sequence number of the first packet 132. The analyzer 122 may update the retrieved partial copies count 106 in response to determining that the first packet 132 is missing from the buffer 126 and that the buffer 126 stores the partial copy of the first packet 132.

The analyzer 122 may generate a processed speech signal 116 based on at least the next packet (e.g., the second packet 134). For example, the analyzer 122 may generate the processed speech signal 116 based on the first partial copy 174 and the second data 166. The first partial copy 174 may include at least a portion of the first data 164 of the first packet 132. In a particular aspect, the first data 164 may correspond to first speech parameters of a first speech frame. The first partial copy 174 may include the first speech parameters. In a particular aspect, the second data 166 may correspond to second speech parameters of a second speech frame and the first partial copy 174 may correspond to a difference between the first speech parameters and the second speech parameters. In this aspect, the analyzer 122 may generate the first speech parameters based on a sum of the second speech parameters and the first partial copy 174.

The analyzer 122 may generate the processed speech signal 116 based on the first speech parameters. It will be appreciated that having the first partial copy 174 as error correction data in the second packet 134 may enable generation of the processed speech signal 116 based on the first speech parameters of the particular speech frame even when the first packet 132 corresponding to the particular speech frame is missing from the buffer 126.

In a particular aspect, the analyzer 122 may provide the first partial copy 174, the second packet 134, or the first speech parameters to the speech decoder 156 and the speech decoder 156 may generate the processed speech signal 116. The analyzer 122 (or the speech decoder 156) may output the processed speech signal 116 via the speaker 142 to the first user 152. The analyzer 122 may update (e.g., increment or reset) the next sequence number. The processed speech signal 116 may have a better audio quality than a processed speech signal generated based only on the second data 166. For example, the processed speech signal 116 generated based on the first partial copy 174 and the second data 166 may have fewer user perceptible artifacts than the processed speech signal generated based on the second data 166 and not based on the first data 164 (or the first partial copy 174).

In a particular aspect, the analyzer 122 may determine that the first packet 132 and the second packet 134 are missing from the buffer 126. For example, the analyzer 122 may determine that the first packet 132 is missing from the buffer 126 and that the buffer 126 does not store the partial copy of the first packet 132 as error correction data in another packet. To illustrate, the analyzer 122 may determine that the sequence number of the first packet 132 is not indicated by the particular field of any of the packets corresponding to the input speech signal 130 that are stored in the buffer 126. The analyzer 122 may update the count of lost packets 114 based on determining that the first packet 132 and the second packet 134 are missing from the buffer 126. In a particular aspect, the analyzer 122 may update (e.g., increment by 1) the count of lost packets 114 to reflect that the first packet 132 is missing from the buffer 126 and that the buffer 126 does not store a packet (e.g., the second packet 134) that includes a partial copy of the first packet 132. The analyzer 122 may update (e.g., increment or reset) the next sequence number.

The analyzer 122 may adjust the error recovery parameter 108 based on the count of lost packets 114, the retrieved partial copies count 106, or both, as described with reference to FIGS. 2-3. For example, the analyzer 122 may determine the result value 118 based on the count of lost packets 114, the retrieved partial copies count 106, or both. In a particular aspect, the result value 118 may be a weighted sum of the count of lost packets 114 and the retrieved partial copies count 106. In a particular aspect, the analyzer 122 may determine the result value 118 based on a sum of the count of lost packets 114 (e.g., having a weight of 1) and a weighted value. The analyzer 122 may determine the weighted value by multiplying the retrieved partial copies count 106 by the quality metric 128. The quality metric 128 may be a default value, a user-provided value, or both. The quality metric 128 may correspond to the weight (e.g., greater than or equal to 0 and less than or equal to 1) assigned to the retrieved partial copies count 106.

In a particular aspect, the quality metric 128 may be a measure of quality of retrieved partial copies. To illustrate, when the measure of quality of the retrieved partial copies is higher, the quality metric 128 may correspond to a lower weight. The analyzer 122 may determine the measure of quality based on a difference between data (e.g., speech parameters) corresponding to a retrieved partial copy (e.g., the first partial copy 174) and previous data (e.g., previous speech parameters) retrieved from a previous packet corresponding to a previous audio frame. For example, the analyzer 122 may determine the measure of quality based on a difference between the speech parameters and the previous speech parameters satisfying a particular threshold. If the retrieved partial copy (e.g., the first partial copy 174) corresponds to sufficiently different parameters, then generating the processed speech signal 116 based on the retrieved partial copy (e.g., the first partial copy 174) may significantly improve audio quality of the processed speech signal 116 when a corresponding primary packet (e.g., the first packet 132) is not stored in the buffer 126. The analyzer 122 may determine a higher measure of quality when the retrieved partial copy (e.g., the first partial copy 174) corresponds to sufficiently different parameters than the previous packet.

In a particular aspect, the retrieved partial copies count 106 may be assigned a lower weight than the count of lost packets 114. Assigning a lower weight to the count of retrieved partial copies may enable partial redundancy to reduce an impact of corresponding missing packets on the adjustment of the error recovery parameter. It will be appreciated that having partial redundancy may enable use of a smaller buffer, fewer retransmission requests, or both, than having no redundancy.

The analyzer 122 may adjust the error recovery parameter 108 (e.g., the buffer depth 110, the retransmission threshold 112, or both) based on the result value 118. For example, the analyzer 122 may increment the error recovery parameter 108 based on the increment amount 140 in response to determining that the result value 118 satisfies the increment threshold 136, as described with reference to FIGS. 2-3. In a particular aspect, the result value 118 may satisfy the increment threshold 136 during conditions of high packet loss that may result in a perceptible degradation in audio quality of processed speech signals. The analyzer 122 may increment the buffer depth 110 to increase a likelihood of a partial copy of a lost packet being in the buffer as error correction data in another packet. The analyzer 122 may increment the retransmission threshold 112 to enable the destination device 102 to send more retransmission messages (e.g., the retransmission message 144) to the source device 104 to request retransmission of lost packets. The destination device 102 may generate processed speech signal based on retransmitted packets and an audio quality of the processed speech signals may improve.

As another example, the analyzer 122 may decrement the error recovery parameter 108 based on the decrement amount 150 in response to determining that the result value 118 satisfies the decrement threshold 138, as described with reference to FIGS. 2-3. In a particular aspect, the result value 118 may satisfy the decrement threshold 138 during conditions of low packet loss. The analyzer 122 may decrement the buffer depth 110 to decrease memory usage by the buffer 126. The analyzer 122 may decrement the retransmission threshold 112 to reduce a number of retransmission messages (e.g., the retransmission message 144) sent by the destination device 102 to request retransmission of lost packets. Fewer retransmission messages may result in reduced bandwidth usage associated with sending the retransmission messages and retransmitting packets.

In a particular aspect, the error recovery parameter 108 may have a maximum value, a minimum value, or both. In this aspect, the analyzer 122 may adjust the error recovery parameter 108 within a range bounded by the minimum value and the maximum value.

One or more of the increment threshold 136, the decrement threshold 138, the increment amount 140, and the decrement amount 150 may have distinct values or the same values for each error recovery parameter. For example, one or more of the increment threshold 136, the decrement threshold 138, the increment amount 140, and the decrement amount 150 corresponding to the buffer depth 110 may be distinct from one or more of the increment threshold 136, the decrement threshold 138, the increment amount 140, and the decrement amount 150 corresponding to the retransmission threshold 112.

The increment threshold 136, the decrement threshold 138, the increment amount 140, the decrement amount 150, or a combination thereof, may be default values. In a particular aspect, the analyzer 122 may dynamically determine the increment amount 140, the decrement amount 150, or both. For example, the analyzer 122 may determine the increment amount 140 based on a difference between the result value 118 and the increment threshold 136. As another example, the analyzer 122 may determine the decrement amount 150 based on a difference between the result value 118 and the decrement threshold 138.

In a particular aspect, the analyzer 122 may determine an adjustment amount of the error recovery parameter 108 based on the result value 118 and may delay adjusting the error recovery parameter 108 based on the adjustment amount to a later time. For example, the analyzer 122 may iteratively determine the adjustment amount based on a first number (e.g., 10) of packets and may adjust the error recovery parameter 108 subsequent to processing the first number of packets. As another example, the destination device 102 may receive packets in bursts from the source device 104. For example, the second user 194 may pause between talking and each burst of packets may correspond to speech of the second user 194 between pauses. The analyzer 122 may adjust the error recovery parameter 108 based on the adjustment amount during a pause so that a next burst of packets may be processed based on the adjusted error recovery parameter 108 and so that the adjustment of the error recovery parameter 108 may not be perceptible to a user.

In a particular aspect, the analyzer 122 may request retransmission of a particular packet (e.g., the first packet 132) based on the retransmission count 154, the retransmission threshold 112, or both. For example, the analyzer 122 may send a retransmit message 144, via the transmitter 192, to the source device 104 based on determining that the retransmission count 154 satisfies the retransmission threshold 112 and that the first packet 132 is missing from the buffer 126. The retransmit message 144 may request retransmission of the first packet 132.

The retransmission count 154 may have a default initial value. The analyzer 122 may update the retransmission count 154 (e.g., increment) based on sending the retransmit message 144. In a particular aspect, the retransmission count 154 may be associated with a particular time period. For example, the retransmission count 154 may indicate a number of retransmit messages sent by the analyzer 122 during the particular time period (e.g., a previous 5 minutes).

The source device 104 may retransmit the first packet 132 in response to receiving the retransmit message 144. In this aspect, the analyzer 122 may receive the retransmitted first packet 132 and may generate a processed speech signal based on at least the first data 164 from the retransmitted first packet 132. For example, the analyzer 122 may generate the processed speech signal based on the first data 164 from the retransmitted first packet 132 and the second data 166 from the second packet 134 in response to determining that the buffer 126 stores the second packet 134. In a particular aspect, there may be a round trip delay (e.g., 8 milliseconds (ms) to 16 ms) associated with sending the retransmit message 144 and receiving the retransmitted first packet 132. For example, there may be a maximum number (e.g., 8) of hybrid automatic repeat request (HARQ) instances between the source device 104 and the destination device 102. The source device 104 may send the first packet 132 during a first HARQ instance. The destination device 102 may send the retransmit message 144 during a second HARQ instance. The source device 104 may send the retransmitted first packet 132 during a third HARQ instance. The round trip delay (e.g., 8 ms to 16 ms) may correspond to a time difference between the first HARQ instance and the third HARQ instance.

In a particular implementation, a transmission timeline may be partitioned into units of subframes. Each subframe may cover a predetermined time duration, e.g., 1 milliseconds (ms). The source device 104 may have data to send to the destination device 102 and may process the first packet 132 in accordance with a selected transport format to obtain data symbols. A transport format may correspond to a rate, a packet format, a modulation and coding scheme (MCS), etc. The source device 104 may send a first transmission of the first packet 132 as well as control information to the destination device 102 in subframe t. The control information may indicate the selected transport format, the radio resources used for data transmission, etc. The destination device 102 may receive and process the first transmission in accordance with the selected transport format. If the destination device 102 is unable to successfully decode the first packet 132 (e.g., an error is encountered or the first packet 132 is not received when expected, the destination device 102 may send a negative acknowledgement (NAK) in subframe t+Δ.

The NAK acts as a retransmission request. Accordingly, the source device 104 may receive the NAK and send a second transmission of the first packet 132 in subframe t+M. The destination device 102 may again attempt to decode the first packet 132. If an error occurs, the destination device 102 may send another NAK (e.g., in subframe t+M+Δ). Each transmission of the first packet 132 after the initial transmission at subframe t may be referred to as an HARQ transmission and may include different redundancy information (e.g., a different set of data symbols) for the first packet 132.

The system 100 may support synchronous HARQ and/or asynchronous HARQ. For synchronous HARQ, transmissions of a packet (e.g., the first packet 132) may be sent in subframes that are known a priori by a transmitter (e.g., the source device 104) and a receiver (e.g., the destination device 102). For asynchronous HARQ, transmissions of a packet (e.g., the first packet 132) may be scheduled and sent in one or more subframes. In a particular implementation, the system 100 may support HARQ, automatic repeat request (ARQ), another retransmission protocol, or a combination thereof.

In a particular aspect, the analyzer 122 may refrain from requesting retransmission of a particular packet (e.g., the first packet 132) based on determining that the retransmission count 154 fails to satisfy the retransmission threshold 112, that the particular packet (e.g., the first packet 132) is stored in the buffer 126, that a partial copy (e.g., the first partial copy 174) of the particular packet (e.g., the first packet 132) is stored in the buffer 126, or a combination thereof. It will be appreciated that generating the processed speech signal 116 based on the retransmitted first packet 132 may result in the processed speech signal 116 having a better audio quality, while generating the processed speech signal 116 based on the first partial copy 174 may result in the processed speech signal 116 being generated without the round trip delay (e.g., 8 ms to 16 ms) associated with requesting and receiving the retransmitted first packet 132.

In a particular aspect, the analyzer 122 may drop a packet based on the buffer depth 110. For example, the analyzer 122 may determine that a number (or total size) of packets stored in the buffer 126 satisfies the buffer depth 110. The analyzer 122 may, in response to receiving a subsequent packet, refrain from storing the subsequent packet in the buffer 126 or may remove one or more other packets from the buffer 126. For example, the analyzer 122 may remove a packet that has been in the buffer 126 for a longest duration, may remove a packet that does not include error correction data corresponding to another packet, or both.

Thus, the system 100 may enable partial recovery of data of a lost packet without retransmission of the lost packet. For example, the analyzer 122 may recover the first partial copy 174 from the second packet 134 in response to determining that the first packet 132 is not stored in the buffer 126. Another particular advantage is dynamically adjusting an error recovery parameter based on a count of retrieved partial copies, a count of lost packets, or both. For example, the analyzer 122 may dynamically adjust the error recovery parameter 108 based on the retrieved partial copies count 106, the count of lost packets 114, or both. Thus, the error recovery parameter 108 may be responsive to network conditions, a degree of redundancy in the received packets, or both.

Figure 2:
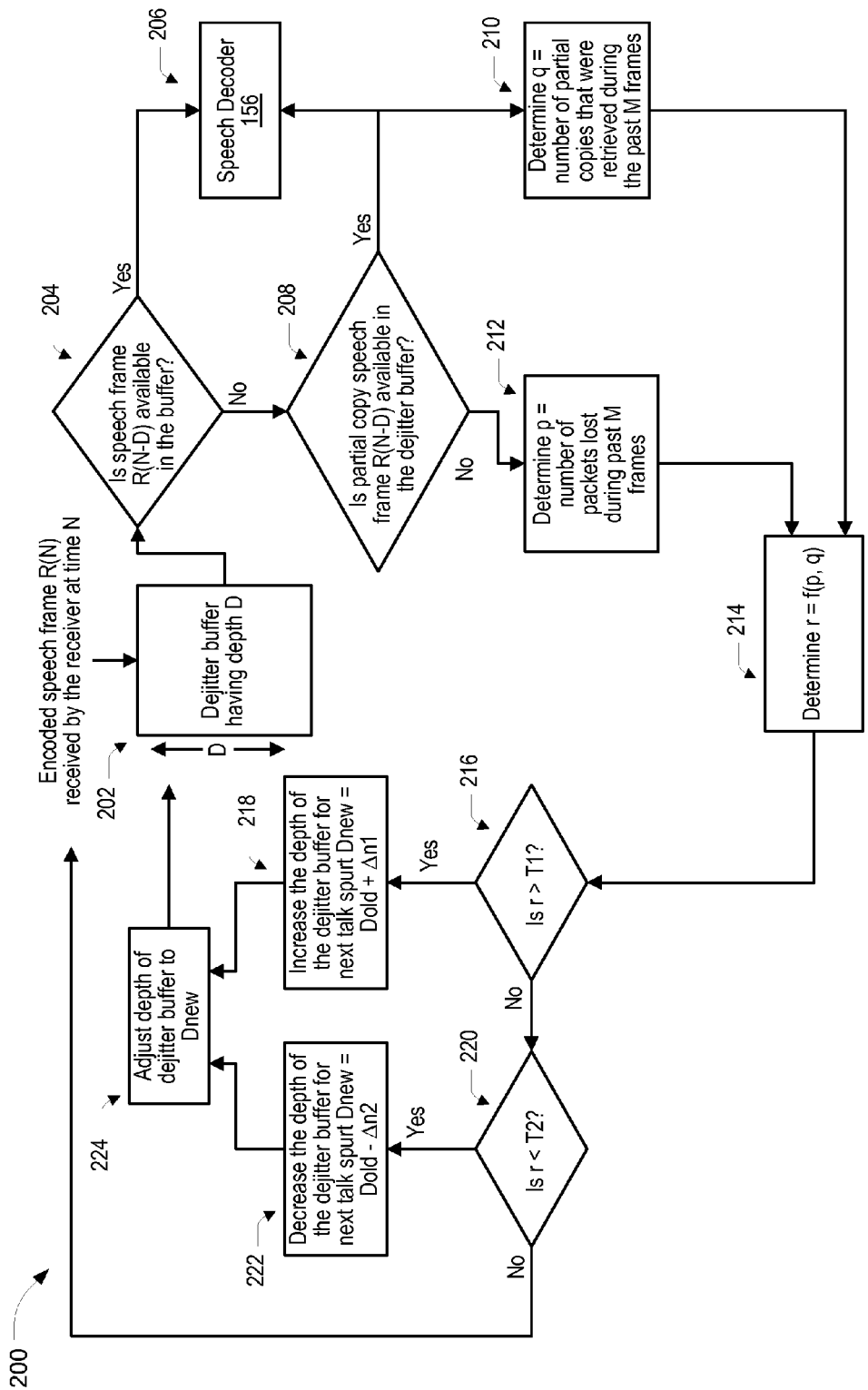
FIG. 2 is a diagram of a particular aspect of method of redundancy based packet transmission error recovery.

Referring to FIG. 2, a particular illustrative aspect of a method of redundancy based packet transmission error recovery is disclosed and generally designated 200. In a particular aspect, the method 200 may be performed by the analyzer 122 of FIG. 1. FIG. 2 illustrates adjustment of the buffer depth 110 of FIG. 1 based on the count of lost packets 114, the retrieved partial copies count 106, or both. For example, the adjustment of the buffer depth 110 may be a function of the count of lost packets 114 (p), a function of the retrieved partial copies count 106 (q), or a function of the count of lost packets 114 (p) and the retrieved partial copies count 106 (q).

The method 200 includes receiving, by a receiver, an encoded speech frame R(N) at time N, at 202. For example, the receiver 124 of FIG. 1 may receive a particular packet corresponding to a particular audio frame of the input speech signal 130, as described with reference to FIG. 1.

The method 200 also includes determining whether a next speech frame R(N-D) is available in a de jitter buffer, at 204. For example, the analyzer 122 may determine whether a next packet is stored in the buffer 126, as described with reference to FIG. 1. The next packet may have a next sequence number. In a particular aspect, the analyzer 122 may determine the next sequence number by incrementing a sequence number of a previously processed packet. In an alternative aspect, the analyzer 122 may determine the next sequence number based on a difference between a sequence number of a most recently received packet (e.g., N) and the buffer depth 110 (e.g., D). In this aspect, the buffer depth 110 may indicate a maximum number of packets that are to be stored in the buffer 126. The analyzer 122 may determine whether the next packet (e.g., the first packet 132) corresponding to the next sequence number is stored in the buffer 126.

The method 200 further includes, in response to determining that the next speech frame R(N-D) is available in the de jitter buffer, at 204, providing the next speech frame R(N-D) to a speech decoder, at 206. For example, the analyzer 122 may, in response to determining that the next packet (e.g., the first packet 132) is stored in the buffer 126, provide the first packet 132 to the speech decoder 156, as described with reference to FIG. 1.

The method 200 also includes, in response to determining that the next speech frame R(N-D) is unavailable in the de jitter buffer, at 204, determining whether a partial copy of the next speech frame R(N-D) is available in the de-jitter buffer, at 208. For example, the analyzer 122 of FIG. 1 may, in response to determining that the first packet 132 is not stored in the buffer 126, determine whether a partial copy of the first packet 132 is stored in the buffer 126, as described with reference to FIG. 1. To illustrate, the analyzer 122 may determine whether the second packet 134 that has the first partial copy 174 is stored in the buffer 126.

The method 200 further includes, in response to determining that the partial copy of the next speech frame R(N-D) is available in the de-jitter buffer, at 208, providing the partial copy of the next speech frame R(N-D) to the speech decoder, at 206, and determining a number (q) of partial copies that were retrieved during M previous frames, at 210. For example, the analyzer 122 of FIG. 1 may, in response to determining that the second packet 134 is included in the buffer 126 and that the second packet 134 includes the first partial copy 174 of the first packet 132, provide the second packet 134 to the speech decoder 156. In a particular aspect, the analyzer 122 may provide the first partial copy 174 to the speech decoder 156. The analyzer 122 may also update the retrieved partial copies count 106, as described with reference to FIG. 1. For example, the retrieved partial copies count 106 may correspond to a particular number of frames, a particular time period, or both. The particular number (M) of frames may correspond to a default value. In a particular aspect, the particular number (M) of frames may be selected by the analyzer 122 or by a user (e.g., the first user 152). In a particular aspect, the particular number (M) of frames may be adaptive. For example, the analyzer 122 may update the particular number (M) of frames over time. In a particular aspect, the analyzer 122 may update the particular number (M) of frames based on a number of times that the buffer depth 110 has been adjusted during a particular time period (e.g., 5 minutes). For example, the analyzer 122 may update (e.g., increase or decrease) the particular number (M) of frames in response to determining that the number of times that the buffer depth 110 has been adjusted during the particular time period satisfies an adjustment threshold.

In a particular aspect, the retrieved partial copies count 106 may indicate a number of partial copies retrieved out of a particular number (M) of most recently processed packets. For example, out of the particular number (e.g., ten) of packets most recently processed by the analyzer 122, the analyzer 122 may have successfully received a first number (e.g., 7) of packets, the analyzer 122 may have retrieved partial copies for a second number (e.g., 2) of packets that were not successfully received by the analyzer 122, and partial copies may have been unavailable for the remaining number (e.g., 1) of the packets that were not successfully received by the analyzer 122. In this example, the retrieved partial copies count 106 may indicate that partial copies were retrieved for the second number (e.g., 2) of packets out of the particular number (e.g., 10) of the most recently processed packets.

In an alternate aspect, the retrieved partial copies count 106 may indicate a number of partial copies retrieved during a particular time period (e.g., previous 5 minutes). For example, the analyzer 122 may receive a particular number (e.g., 20) of packets during the particular time period (e.g., the previous 5 minutes). Out of the particular number (e.g., 20) of packets, the analyzer 122 may have successfully received a first number (e.g., 12) of packets, the analyzer 122 may have retrieved partial copies for a second number (e.g., 6) of packets that were not successfully received by the analyzer 122, and partial copies may have been unavailable for the remaining number (e.g., 2) of the packets that were not successfully received by the analyzer 122. In this example, the retrieved partial copies count 106 may indicate that partial copies were retrieved for the second number (e.g., 6) of packets received by the analyzer 122 during the particular time period (e.g., the previous 5 minutes). The method 200 may proceed to 214.

The method 200 also includes, in response to determining that the partial copy of the next speech frame R(N-D) is unavailable in the de-jitter buffer, at 208, determining a number (p) of packets lost during the M previous frames, at 212. For example, the analyzer 122 of FIG. 1 may, in response to determining that the second packet 134 is not stored in the buffer 126, update the count of lost packets 114, as described with reference to FIG. 1. To illustrate, the analyzer 122 may determine that the buffer 126 does not store a packet (e.g., the second packet 134) that indicates that a partial copy (e.g., the first partial copy 174) of the first packet 132 is included in the packet.

The method 200 further includes determining a result value (r) based on the number (p) of packets lost during the M previous frames and the number (q) of partial copies that were retrieved during M previous frames, at 214. For example, the analyzer 122 of FIG. 1 may determine the result value 118 (r) based on the count of lost packets 114 (p), the retrieved partial copies count 106 (q), or both, as described with reference to FIG. 1. In the example illustrated in FIG. 2, r=f(p, q). The result value 118 (r) may be a function of the count of lost packets 114 (p), a function of the retrieved partial copies count 106 (q), or a function of the count of lost packets 114 (p) and the retrieved partial copies count 106 (q). For example, the result value 118 may be a weighted sum of the count of lost packets 114 and the retrieved partial copies count 106.

The method 200 also includes determining whether the result value (r) is greater than an increment threshold ($T_1$), at 216. For example, the analyzer 122 of FIG. 1 may determine whether the result value 118 satisfies (e.g., is greater than) the increment threshold 136, as described with reference to FIG. 1.

The method 200 further includes, in response to determining that the result value (r) is greater than the increment threshold ($T_1$), at 216, determining a depth value ($D_{new}$) based on a sum of an increment amount ($\Delta n_1$) and a depth ($D_{old}$) of a de-jitter buffer for next talk spurt, at 222. For example, the analyzer 122 of FIG. 1, may in response to determining that the result value 118 satisfies (e.g., is greater than) the increment threshold 136, determine an adjustment amount (e.g., $D_{new}$) based on a sum of the increment amount 140 and the buffer depth 110 (e.g., $D_{old}$), as described with reference to FIG. 1. The method 200 may proceed to 224.

The method 200 also includes, in response to determining that the result value (r) is less than or equal to the increment threshold ($T_1$), at 216, determining whether the result value (r) is less than the decrement threshold ($T_2$), at 220. For example, the analyzer 122 of FIG. 1 may, in response to determining that the result value 118 fails to satisfy (e.g., is less than or equal to) the increment threshold 136, determine whether the result value 118 satisfies (e.g., is less than) the decrement threshold 138, as described with reference to FIG. 1.

The method 200 further includes, in response to determining that the result value (r) is less than the decrement threshold ($T_2$), at 220, decreasing the depth value ($D_{new}$) based on a difference between a decrement amount ($\Delta n_2$) and the depth ($D_{old}$) of the de-jitter buffer for the next talk spurt, at 222. For example, the analyzer 122 of FIG. 1 may, in response to determining that the result value 118 satisfies (e.g., is less than) the decrement threshold 138, determine the adjustment amount (e.g., $D_{new}$) based on a difference between the decrement amount 150 and the buffer depth 110 (e.g., $D_{old}$), as described with reference to FIG. 1.

The method 200 also includes adjusting the depth of the de-jitter buffer to the depth value ($D_{new}$), at 224. For example, the analyzer 122 of FIG. 1 may adjust the buffer depth 110 based on the adjustment amount (e.g., $D_{new}$), as described with reference to FIG. 1. The method 200 may proceed to 202.

The method 200 also includes, in response to determining that the result value (r) is greater than or equal to the decrement threshold ($T_2$), at 220, receiving a subsequent packet, at 202. For example, the analyzer 122 of FIG. 1 may refrain from adjusting the buffer depth 110 in response to determining that the result value 118 fails to satisfy the increment threshold 136 and the decrement threshold 138.

The buffer depth 110 (e.g., D) may have a first depth value (e.g., Dow). For example, $D=D_{old}$. The analyzer 122 may determine a second depth value (e.g., $D_{new}$) based at least in part on the first depth value (e.g., $D_{old}$). The analyzer 122 may adjust the buffer depth 110 (e.g., D) based on the second depth value (e.g., $D_{new}$). For example, $D=D_{new}$ subsequent to adjustment of the buffer depth 110.

The method 200 may enable dynamic adjustment of the depth of the de jitter buffer based on a count of lost packets, a retrieved partial copies count, or both. The buffer depth may be responsive to network conditions. During conditions of high packet loss, lack of data redundancy, or both, the buffer depth may be increased to reduce packets dropped at a destination device, to increase a likelihood of finding partial copies of lost packets in a de jitter buffer, or both. Alternatively, during conditions of low packet loss, high degree of data redundancy, or both, the buffer depth may be decreased to reduce memory usage by the de-jitter buffer.

Figure 3:
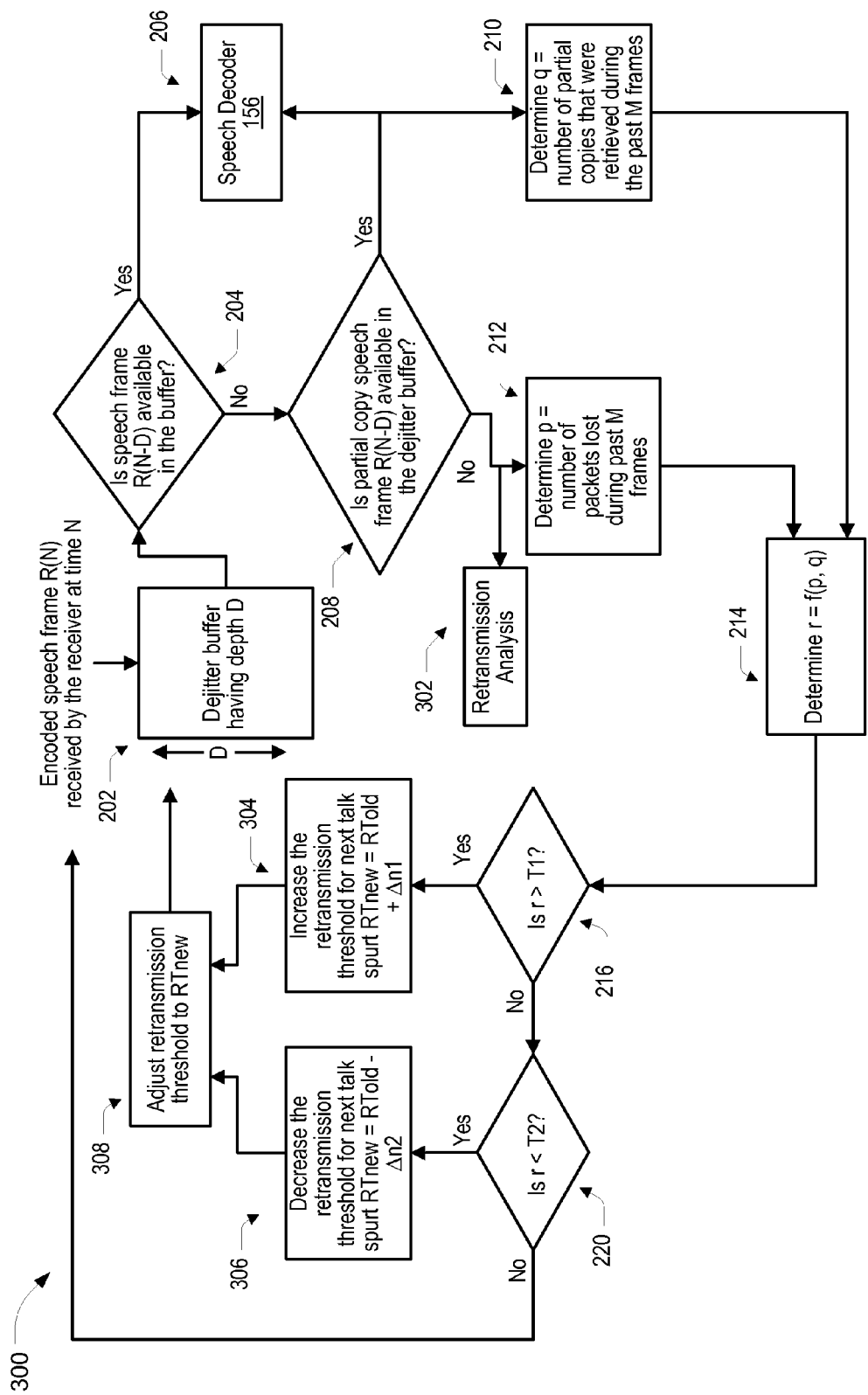
FIG. 3 is a diagram of another particular aspect of method of redundancy based packet transmission error recovery.

Referring to FIG. 3, a particular illustrative aspect of a method of redundancy based packet transmission error recovery is disclosed and generally designated 300. In a particular aspect, the method 300 may be performed by the analyzer 122 of FIG. 1.

FIG. 3 illustrates adjustment of the retransmission threshold 112 of FIG. 1 based on the count of lost packets 114, the retrieved partial copies count 106, or both. The method 300 includes 202, 204, 206, 208, 210, 212, 214, 216, and 220 of the method 200 of FIG. 2.

The method 300 also includes, in response to determining that a partial copy of a next speech frame R(N-D) is unavailable in a de-jitter buffer, at 208, performing retransmission analysis, at 302. For example, the analyzer 122 of FIG. 1 may perform retransmission analysis in response to determining that the buffer 126 stores neither the first packet 132 nor another packet that indicates that a partial copy of the first packet 132 is included in the other packet, as described with reference to FIG. 4.

The method 300 further includes, in response to determining that the result value (r) is greater than the increment threshold ($T_1$), at 216, determining a retransmission value ($RT_{new}$) based on a sum of an increment amount ($\Delta n_1$) and a retransmission threshold ($RT_{old}$), at 304. For example, the analyzer 122 of FIG. 1, may in response to determining that the result value 118 satisfies (e.g., is greater than) the increment threshold 136, determine an adjustment amount (e.g., $RT_{new}$) based on a sum of the increment amount 140 and the retransmission threshold 112 (e.g., $RT_{old}$), as described with reference to FIG. 1. The method 300 may proceed to 308.

The method 300 also includes, in response to determining that the result value (r) is less than the decrement threshold ($T_2$), at 220, decreasing the retransmission value ($RT_{new}$) based on a difference between a decrement amount ($\Delta n_2$) and the retransmission threshold ($RT_{old}$), at 306. For example, the analyzer 122 of FIG. 1 may, in response to determining that the result value 118 satisfies (e.g., is less than) the decrement threshold 138, determine the adjustment amount (e.g., $RT_{new}$) based on a difference between the decrement amount 150 and the retransmission threshold 112 (e.g., $RT_{old}$), as described with reference to FIG. 1.

The method 300 also includes adjusting the retransmission value to the retransmission value ($RT_{new}$), at 308. For example, the analyzer 122 of FIG. 1 may adjust the retransmission threshold 112 based on the adjustment amount (e.g., $RT_{new}$), as described with reference to FIG. 1. The method 300 may proceed to 202.

The retransmission threshold 112 (e.g., RT) may have a first retransmission threshold value (e.g., $RT_{old}$). For example, $RT=RT_{old}$. The analyzer 122 may determine a second retransmission threshold value (e.g., $RT_{new}$) based at least in part on the first retransmission value (e.g., $RT_{old}$). The analyzer 122 may adjust the retransmission threshold 112 (e.g., RT) based on the second retransmission threshold value (e.g., $RT_{new}$). For example, $RT=RT_{new}$ subsequent to adjustment of the retransmission threshold 112. In a particular aspect, the increment threshold (T1) of FIG. 3 may differ from the increment threshold (T1) of FIG. 2. In an alternate aspect, the increment threshold (T1) of FIG. 3 may be the same as the increment threshold (T1) of FIG. 2. In a particular aspect, the decrement threshold (T2) of FIG. 3 may differ from the decrement threshold (T2) of FIG. 2. In an alternate aspect, the decrement threshold (T2) of FIG. 3 may be the same as the decrement threshold (T2) of FIG. 2.

The method 300 may enable dynamic adjustment of a retransmission threshold based on a count of lost packets, a retrieved partial copies count, or both. The retransmission threshold may be responsive to network conditions. During conditions of high packet loss, lack of data redundancy, or both, the retransmission threshold may be increased to enable the destination device to send more retransmission requests. Alternatively, during conditions of low packet loss, high degree of data redundancy, or both, the retransmission threshold may be decreased to reduce retransmission network traffic, to reduce delay in generating a processed speech signal, or both.

Figure 4:
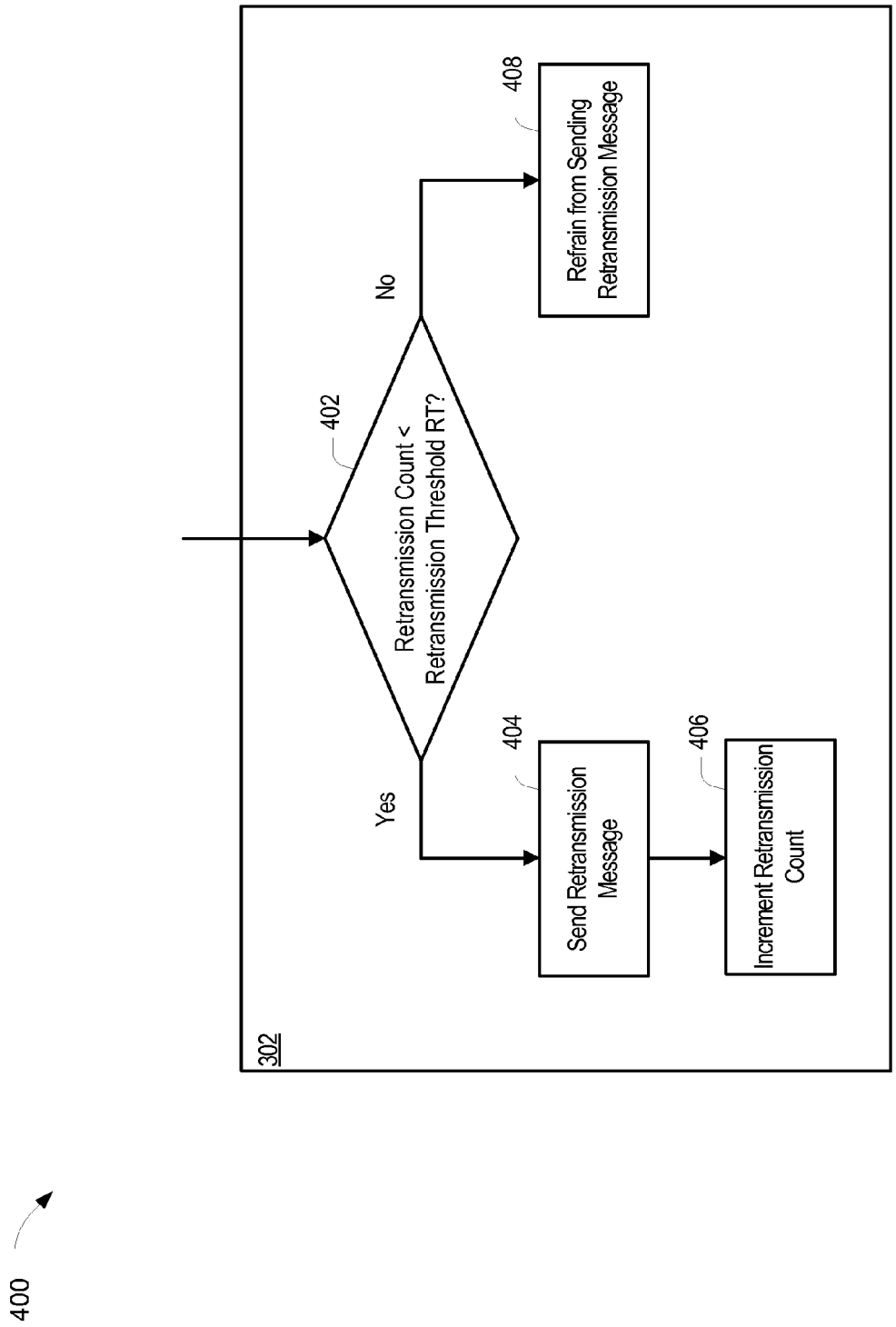
FIG. 4 is a diagram of another particular aspect of method of redundancy based packet transmission error recovery and may correspond to 302 of FIG. 3.

Referring to FIG. 4, a particular illustrative aspect of a method of redundancy based packet transmission error recovery is disclosed and generally designated 400. In a particular aspect, the method 400 may be performed by the analyzer 122 of FIG. 1. In a particular aspect, the method 400 may correspond to 302 of FIG. 3.

The method 400 includes determining whether a retransmission count is less than a retransmission threshold (RT), at 402. For example, the analyzer 122 of FIG. 1 may determine whether the retransmission count 154 satisfies (e.g., is less than) the retransmission threshold 112, as described with reference to FIG. 1.

The method 400 also includes, in response to determining that the retransmission count is less than the retransmission threshold (RT), at 402, sending the retransmission message, at 404, and incrementing the retransmission count, at 406. For example, the analyzer 122 of FIG. 1 may send the retransmission message 144 in response to determining that the retransmission count 154 satisfies (e.g., is less than) the retransmission threshold 112 and may update (e.g., increment) the retransmission count 154, as described with reference to FIG. 1.

The method 400 further includes, in response to determining that the retransmission count is greater than or equal to the retransmission threshold (RT), at 402, refraining from sending a retransmission message, at 408. For example, the analyzer 122 may refrain from sending a retransmission message (e.g., the retransmission message 144) in response to determining that the retransmission count 154 fails to satisfy (e.g., is greater than or equal to) the retransmission threshold 112, as described with reference to FIG. 1.

The method 400 may thus enable a destination device to send retransmission requests based on a dynamically adjusted retransmission threshold. A number of retransmission requests sent by the destination device and a number of packets retransmitted by a source device may be responsive to network conditions. During conditions of high packet loss, lack of data redundancy, or both, the retransmission threshold may be increased to enable the destination device to send more retransmission requests to increase a number of retransmitted packets to reduce errors in the processed speech signal. Alternatively, during conditions of low packet loss, high degree of data redundancy, or both, the retransmission threshold may be decreased to reduce the number of retransmitted packets resulting in a reduction in retransmission network traffic, a reduction in delay associated with generating the processed speech signal, or both.

Figure 5:
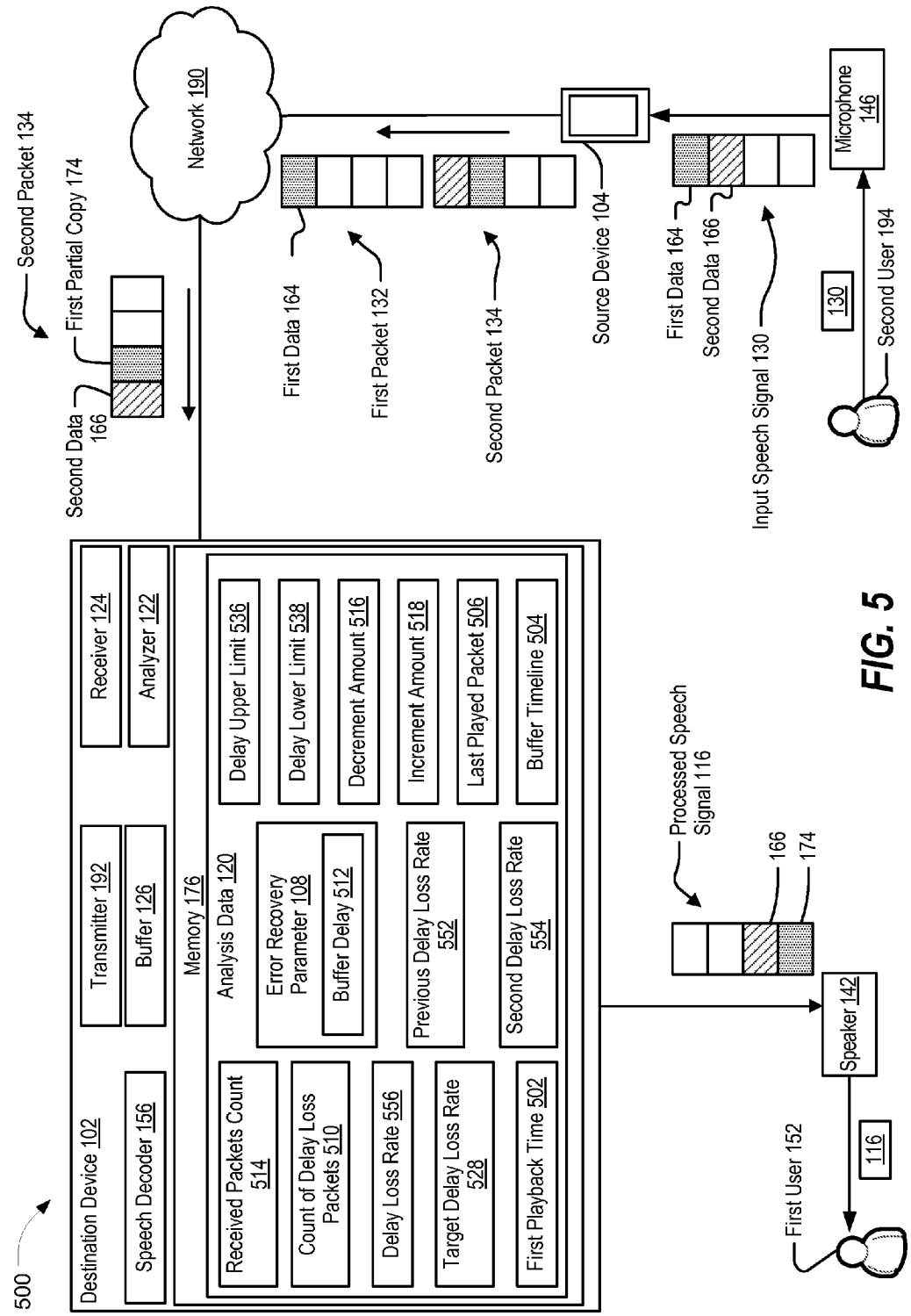
FIG. 5 is a diagram of another particular aspect of a system that is operable to perform redundancy based packet transmission error recovery.

Referring to FIG. 5, a particular illustrative aspect of a system operable to perform redundancy based error recovery is disclosed and generally designated 500. The system 500 may differ from the system 100 of FIG. 1 in that the error recovery parameter 108 may include a buffer delay 512, as described herein.

A sequence of packets may correspond to the input speech signal 130. Each packet of the sequence of packets may include a sequence number, as described with reference to FIG. 1. For example, the first packet 132 may include a first sequence number (e.g., a first generation timestamp) and the second packet 134 may include a second sequence number (e.g., a second generation timestamp). The first generation timestamp may indicate a first time at which the first packet 132 is generated by the source device 104 and the second generation timestamp may indicate a second time at which the second packet 134 is generated by the source device 104. The first partial copy 174 may include the first sequence number (e.g., the first generation timestamp).

Each packet that is received by the destination device 102 may be assigned a receive timestamp by the receiver 124, the analyzer 122, or by another component of the destination device 102. For example, the second packet 134 may be assigned a second receive timestamp. The analyzer 122 may determine a first receive timestamp based on the second receive timestamp and may assign the first receive timestamp to the first partial copy 174. The first receive timestamp may be the same as or distinct from the second receive timestamp. For example, the first receive timestamp may indicate a first receive time that is earlier than a second receive time indicated by the second receive timestamp. In this example, the first receive time may correspond to an estimated time at which the first packet 132 would have been received in a timely manner. To illustrate, the first receive time may correspond to an estimated receive time of the first packet 132 if the first packet 132 had not been delayed or lost.

The analyzer 122 may process a packet based on a receive timestamp associated with the packet, the buffer delay 512, a buffer timeline 504, and a last played packet 506, as described herein. The buffer delay 512 may correspond to a threshold time that a packet is to be stored in the buffer 126. For example, the buffer delay 512 may indicate a first threshold time (e.g., 5 milliseconds). A packet may be received at a first receive time (e.g., 1:00:00.000 PM). A receive timestamp indicating the first receive time may be associated with the packet. A second time (e.g., 1:00:00.005 PM) may correspond to a sum of the first receive time indicated by the receive timestamp and the buffer delay 512. The packet may be processed at or subsequent to the second time.

The buffer timeline 504 may indicate a next packet to be processed. For example, the buffer timeline 504 may indicate a sequence number of a particular packet that was most recently processed from the buffer 126 or for which an erasure was most recently played. To illustrate, the analyzer 122 may update the buffer timeline 504 to indicate a first sequence number of a packet in response to processing the packet from the buffer 126, processing a partial copy of the packet from the buffer 126, or playing an erasure corresponding to the packet. In this example, the analyzer 122 may determine a next sequence number of the next packet to be processed based on the sequence number (e.g., the first sequence number) indicated by the buffer timeline 504.

The last played packet 506 may indicate the particular packet that was most recently processed from the buffer 126. Processing the particular packet from the buffer 126 may include processing the particular packet from the buffer 126 or processing a partial copy of the particular packet from the buffer 126. The analyzer 122 may update the last played packet 506 to indicate a first sequence number of a packet in response to processing the packet from the buffer 126 or processing a partial copy of the packet from the buffer 126.

The analyzer 122 may determine that the last played packet 506 indicates a previous packet that was most recently processed from the buffer 126 by the analyzer 122. The analyzer 122 may determine that a particular packet (e.g., the first packet 132) is subsequent to the previous packet in the sequence of packets. The analyzer 122 may determine whether a next packet to be processed indicated by the buffer timeline 504 is the same as or subsequent to the first packet 132 in the sequence of packets. The analyzer 122 may, at approximately a first playback time 502, play an erasure in response to determining that the next packet to be processed, as indicated by the buffer timeline 504, is prior to the first packet 132 in the sequence of packets.

The analyzer 122 may update the buffer timeline 504 subsequent to playing the erasure. For example, the buffer timeline 504 may, prior to the erasure being played, indicate that a first particular packet is the next packet to be processed. The analyzer 122 may, subsequent to playing the erasure, update the buffer timeline 504 to indicate that a second particular packet is the next packet to be processed. The second particular packet may be next after the first particular packet in the sequence of packets.

Alternatively, the analyzer 122 may, in response to determining that the next packet to be processed indicated by the buffer timeline 504 is the same as or subsequent to the first packet 132 in the sequence of packets, determine whether the buffer 126 stores the first packet 132 (or the first partial copy 174). The analyzer 122 may, in response to determining that the buffer 126 stores the first partial copy 174, determine that the first partial copy 174 is associated with the first receive timestamp indicating the first receive time. The analyzer 122 may, at approximately the first playback time 502, process the first partial copy 174 from the buffer 126 in response to determining that the first time is greater than or equal to a sum of the first receive time and the buffer delay 512. The buffer delay 512 may correspond to a threshold time that a packet is to be stored in the buffer 126. In a particular implementation, the analyzer 122 may process the first partial copy 174 irrespective of whether the first partial copy 174 has been stored in the buffer 126 for the threshold time. In this implementation, the first receive time may be earlier than the second receive time. For example, the first receive time may correspond to an expected receive time of the first packet 132 if the first packet 132 had been received in a timely manner. The analyzer 122 may process the first partial copy 174 at approximately the first playback time in response to determining that the first packet 132 would have been stored in the buffer 126 for at least the threshold time if the first packet 132 had been received in the timely manner. The buffer delay 512 may include a default value, may be based on user input from the first user 152, or both. The analyzer 122 may adjust the buffer delay 512, as described herein. The analyzer 122 may, subsequent to processing the first partial copy 174 from the buffer 126, update the last played packet 508 to indicate the first packet 132 and may update the buffer timeline 504 to indicate a second particular packet (e.g., the second packet 134) as the next packet to be processed. The second particular packet (e.g., the second packet 134) may be next after the first packet 132 in the sequence of packets.

In a particular implementation, the analyzer 122 may, in response to determining that the first packet 132 and the first partial copy 174 are missing from the buffer 126, perform a similar analysis on the second particular packet (e.g., the second packet 134) as performed on the first packet 132. For example, the analyzer 122 may play an erasure in response to determining that the next packet to be processed indicated by the buffer timeline 504 is prior to the second particular packet in the sequence of packets and may update the buffer timeline 504 subsequent to playing the erasure. Alternatively, the analyzer 122 may, at approximately the first playback time 502, process the second particular packet from the buffer 126 in response to determining that the next packet to be processed indicated by the buffer timeline 504 is the same as or subsequent to the second particular packet, that the second particular packet or a partial copy of the second particular packet is stored in the buffer 126, and that the first playback time 502 is greater than or equal to a sum of the buffer delay 512 and a particular receive time associated with the second particular packet.

The destination device 102 may receive the sequence of packets (e.g., the first packet 132, the second packet 134, or both) during a phone call. The first packet 132, the second packet 134, or both, may include speech data. The analyzer 122 may determine or update the buffer delay 512, as described herein, at a beginning of a talk spurt or at an end of the talk spurt during the phone call. A talk spurt may correspond to a continuous segment of speech between silent intervals during which background noise may be heard. For example, a first talk spurt may correspond to speech of the first user 152 and a second talk spurt may correspond to speech of the second user 154. The first talk spurt and the second talk spurt may be separated by a period of silence or background noise.

The analyzer 122 may determine a previous delay loss rate 552. The previous delay loss rate 552 may correspond to a delay loss rate determined during a previous adjustment of the buffer delay 512 at a first update time. The analyzer 122 may maintain a count of delay loss packets 510. The count of delay loss packets 510 may indicate a number of packets that are received subsequent to processing of partial copies of the packets from the buffer 126 at corresponding playback times. The corresponding playback times may be subsequent to the first update time. For example, the analyzer 122 may, subsequent to the first update time, process the first partial copy 174 from the buffer 126 at a first playback time associated with the first packet 132. The analyzer 122 may determine that a first time corresponds to the first playback time based on determining that one or more conditions are satisfied. For example, the first time may correspond to the first playback time if, at the first time, the last played packet 506 is prior to the first packet 132 and the first packet 132 is prior to or the same as the next packet to be processed as indicated by the buffer timeline 504. The first time may correspond to the first playback time if the first time is greater than or equal to a sum of a receive time associated with the first packet 132 (e.g., the first receive time of the first partial copy 174) and the buffer delay 512. The first time may correspond to the first playback time if the first packet 132 is the earliest packet in the sequence of packets that satisfies the preceding conditions at the first time. The analyzer 122 may update (e.g., increment) the count of delay loss packets 510 in response to receiving the first packet 132 subsequent to processing the first partial copy 174.

The analyzer 122 may maintain a received packets count 514. For example, the analyzer 122 may reset the received packets count 514 subsequent to the first update time. The analyzer 122 may update (e.g., increment by 1) the received packets count 514 in response to receiving a packet (e.g., the second packet 134). The analyzer 122 may determine a second delay loss rate 554 based on the count of delay loss packets 510 and the received packets count 514. For example, the second delay loss rate 554 may correspond to a measure (e.g., a ratio) of the count of delay loss packets 510 and the received packets count 514. To illustrate, the second delay loss rate 554 may indicate an average number of delay loss packets (e.g., packets that are received subsequent to processing of partial copies of the packets) during a particular time interval. The second delay loss rate 554 may indicate network jitter during the particular time interval. A difference between the previous delay loss rate 552 and the second delay loss rate 554 may indicate a variation in delay of received packets. The difference between the previous delay loss rate 552 and the second delay loss rate 554 may indicate whether the average number of delay loss packets is increasing or decreasing.

The analyzer 122 may determine a delay loss rate 556 based on the previous delay loss rate 552 and the second delay loss rate 554. For example, the delay loss rate 556 may correspond to a weighted sum of the previous delay loss rate 552 and the second delay loss rate 554. The analyzer 122 may assign a first weight (e.g., 0.75) to the previous delay loss rate 552 and a second weight (e.g., 0.25) to the second delay loss rate 554. The first weight may be the same as or distinct from the second weight. In a particular implementation, the first weight may be higher than the second weight. Determining the delay loss rate 556 based on the weighted sum of the previous delay loss rate 552 and the second delay loss rate 554 may reduce oscillation in the delay loss rate 556 based on temporary network conditions. For example, bundling of packets may cause a large number of packets (e.g., 3) to arrive at the same time followed by no packet arrivals during a subsequent interval. The second delay loss rate 554 may fluctuate from a first time to a second time because the second delay loss rate 554 determined at the first time may correspond to an interval during which a large number of packets is received and the second delay loss rate 554 determined at the second time may correspond to an interval with no packet arrivals. Determining the delay loss rate 556 based on the weighted sum of the previous delay loss rate 552 and the second delay loss rate 554 may reduce an effect of packet bundling on the delay loss rate 556.

The analyzer 122 may decrease the buffer delay 512 by a decrement amount 516 (e.g., 20 milliseconds) in response to determining that the delay loss rate 556 fails to satisfy (e.g., is less than) a target delay loss rate 528 (e.g., 0.01). For example, the target delay loss rate 528 may correspond to a first percent (e.g., 1 percent) of delay loss packets relative to received packets. The analyzer 122 may increase the buffer delay 512 by an increment amount 518 (e.g., 20 milliseconds) in response to determining that the delay loss rate 556 satisfies (e.g., is greater than) the target delay loss rate 528, that the delay loss rate 556 is greater than or equal to the previous delay loss rate 552, or both. The decrement amount 516, the increment amount 518, the target delay loss rate 528, or a combination thereof, may include default values, may be based on user input from the first user 152, or both. The decrement amount 516 may be the same as or distinct from the increment amount 518.

The analyzer 122 may set the buffer delay 512 to a maximum of the buffer delay 512 and a delay lower limit 538 (e.g., 20 milliseconds). For example, the analyzer 122 may set the buffer delay 512 to the delay lower limit 538 in response to determining that the buffer delay 512 is lower than the delay lower limit 538. The analyzer 122 may set the buffer delay 512 to a minimum of the buffer delay 512 and a delay upper limit 536 (e.g., 80 milliseconds). For example, the analyzer 122 may set the buffer delay 512 to the delay upper limit 536 in response to determining that the buffer delay 512 exceeds the delay upper limit 536. The delay lower limit 538, the delay upper limit 536, or both, may be default values, may be based on user input from the first user 152, or both.

The system 500 may thus provide a balance between having a long buffer delay such that delayed packets are likely to be received prior to corresponding playback times and a short buffer delay that reduces an end-to-end delay associated with a sequence of packets.

Figure 6:
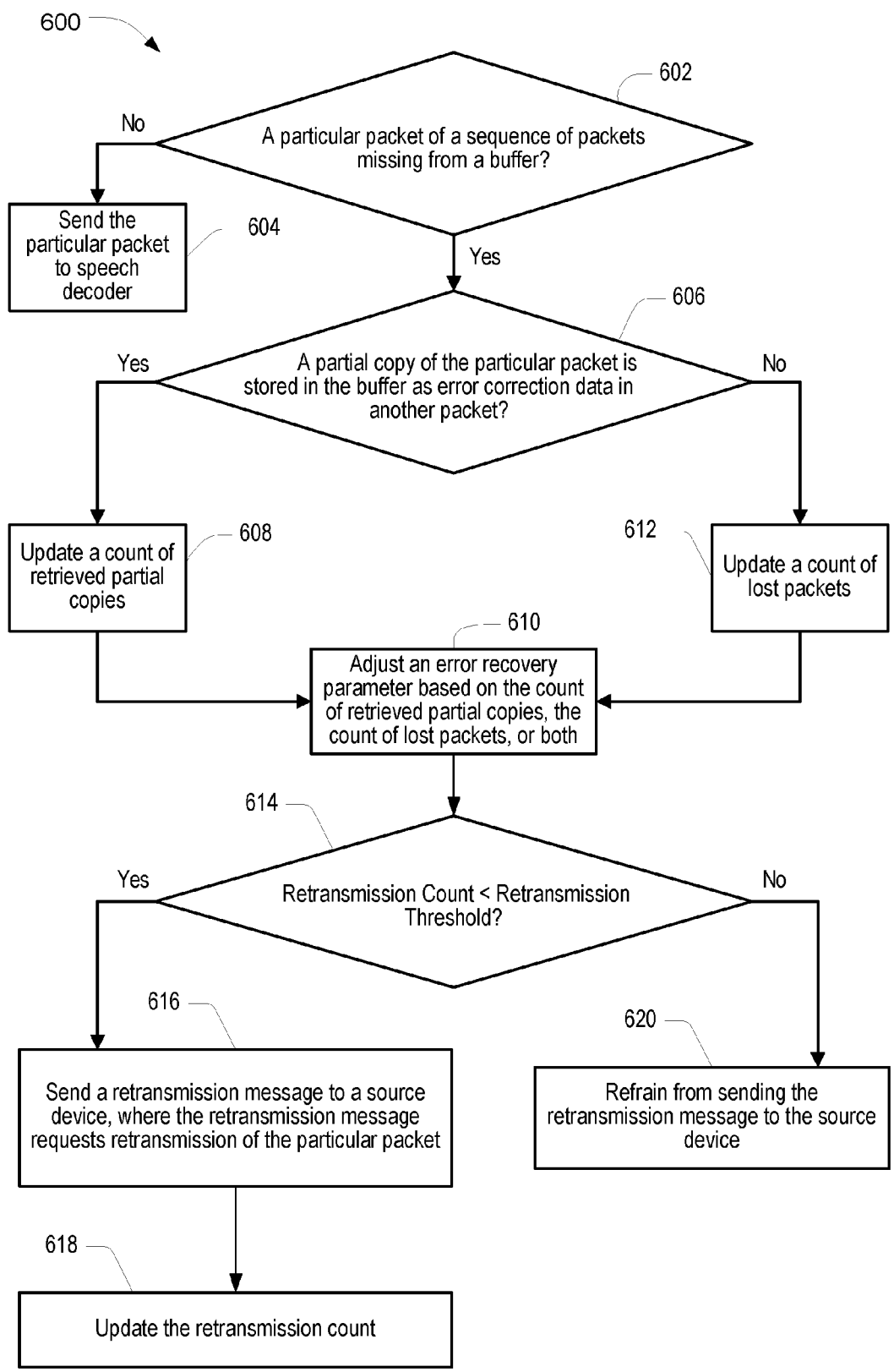
FIG. 6 is a flow chart illustrating a particular method of redundancy based packet transmission error recovery.

Referring to FIG. 6, a flow chart of a particular illustrative aspect of a method of redundancy based packet transmission error recovery is shown and is generally designated 600. In a particular aspect, the method 600 may be executed by the analyzer 122 of FIG. 1.

The method 600 includes determining whether a particular packet of a sequence of packets is missing from a buffer, at 602. For example, the analyzer 122 of FIG. 1 may determine whether a particular packet (e.g., the first packet 132) of a sequence of packets is missing from the buffer 126, as described with reference to FIG. 1.

The method 600 also includes, in response to determining that the particular packet is not missing from the buffer, at 602, sending the particular packet to a speech decoder, at 604. For example, the analyzer 122 of FIG. 1 may send the first packet 132 to the speech decoder 156 in response to determining that the first packet 132 is not missing from the buffer 126, as described with reference to FIG. 1.

The method 600 further includes, in response to determining that the particular packet is missing from the buffer, at 602, determining whether a partial copy of the particular packet is stored in the buffer as error correction data in another packet, at 606. For example, the analyzer 122 of FIG. 1 may, in response to determining that the first packet 132 is missing from the buffer 126, determine whether a partial copy (e.g., the first partial copy 174) of the first packet 132 is stored in the buffer as error correction data in another packet (e.g., the second packet 134), as described with reference to FIG. 1.

The method 600 also includes, in response to determining that the partial copy is stored in the buffer, at 606, updating a count of retrieved partial copies, at 608. The method 600 may proceed to 610. For example, the analyzer 122 of FIG. 1 may update the count of retrieved partial copies count 106 in response to determining that the second packet 134 including the first partial copy 174 is stored in the buffer 126, as described with reference to FIG. 1.

The method 600 further includes, in response to determining that the partial copy is not stored in the buffer, at 606, updating a count of lost packets, at 612. For example, the analyzer 122 of FIG. 1 may update the count of lost packets 114 in response to determining that the second packet 134 including the first partial copy 174 is not stored in the buffer 126, as described with reference to FIG. 1.

The method 600 also includes adjusting an error recovery parameter based on the count of retrieved partial copies, the count of lost packets, or both, at 610. For example, the analyzer 122 of FIG. 1 may adjust the error recovery parameter 108 based on the retrieved partial copies count 106, the count of lost packets 114, or both.

The method 600 further includes determining whether a retransmission count is less than a retransmission threshold, at 614. For example, the analyzer 122 of FIG. 1 may determine whether the retransmission count 154 satisfies (e.g., is less than) the retransmission threshold 112, as described with reference to FIGS. 1 and 4.

The method 600 also includes, in response to determining that the retransmission count is less than the retransmission threshold, at 614, sending a retransmission message to a source device, at 616, and updating the retransmission count, at 618. For example, the analyzer 122 of FIG. 1 may, in response to determining that the retransmission count 154 satisfies (e.g., is less than) the retransmission threshold 112, send the retransmission message 144 to the source device 104 and update the retransmission count 154, as described with reference to FIG. 1. The retransmission request may request retransmission of the particular packet.

The method 600 further includes, in response to determining that the retransmission count is greater than or equal to the retransmission threshold, at 614, refraining from sending the retransmission message to the source device, at 620. For example, the analyzer 122 of FIG. 1 may refrain from sending the retransmission message 144 to the source device 104 in response to determining that the retransmission count 154 fails to satisfy (e.g., is greater than or equal to) the retransmission threshold 112, as described with reference to FIG. 1.

The method 600 may thus enable dynamic adjustment of an error recovery parameter based on a count of lost packets, a count of retrieved partial copies, or both.

The method 600 of FIG. 6 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 600 of FIG. 6 may be performed by a processor that executes instructions, as described with respect to FIG. 9.

Figure 7:
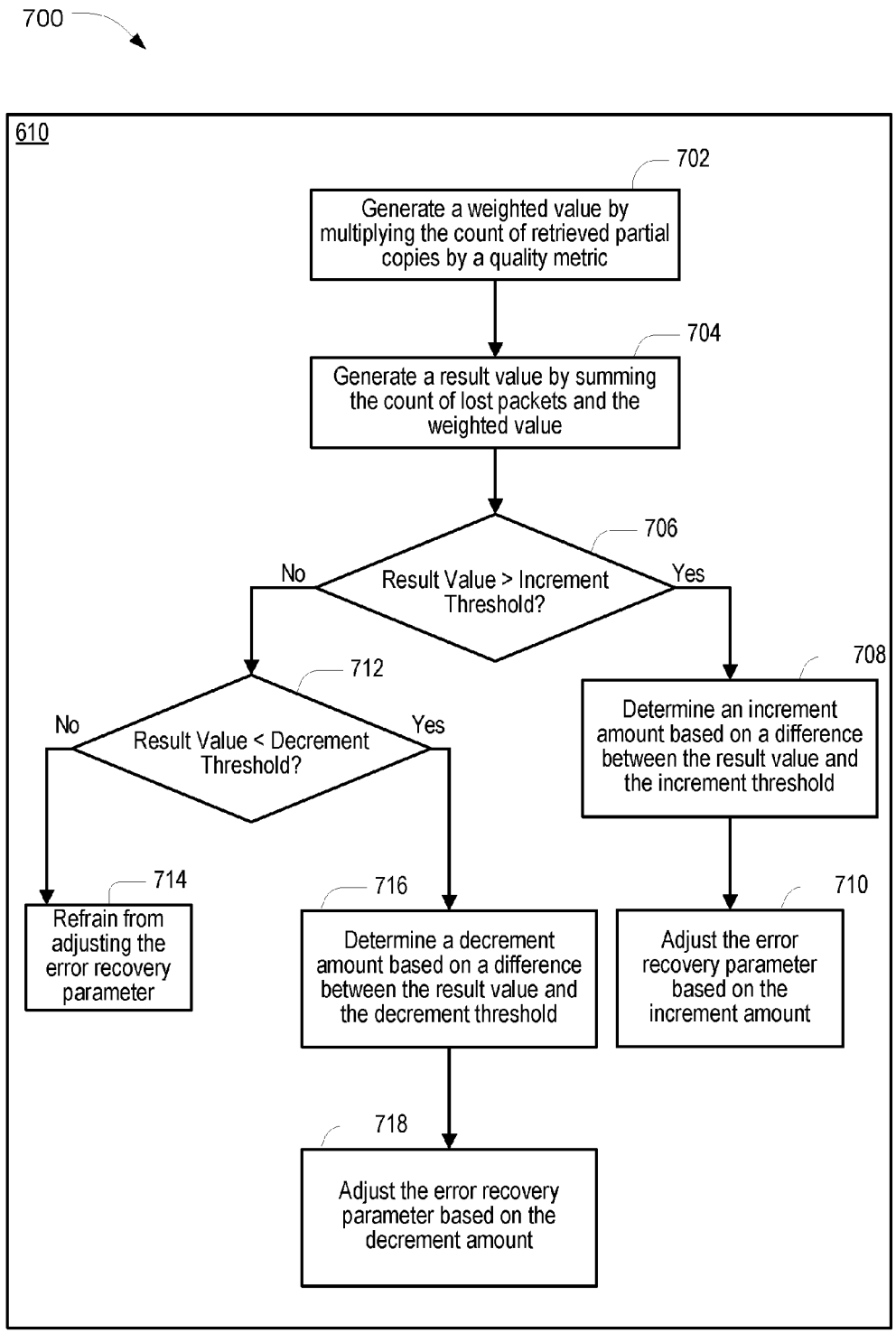
FIG. 7 is a flow chart illustrating another particular method of redundancy based packet transmission error recovery.

Referring to FIG. 7, a flow chart of a particular illustrative aspect of a method of redundancy based packet transmission error recovery is shown and is generally designated 700. In a particular aspect, the method 700 may be executed by the analyzer 122 of FIG. 1. In a particular aspect, the method 700 may correspond to 610 of FIG. 6.

The method 700 includes generating a weighted value by multiplying a count of retrieved partial copies by a quality metric, at 702. For example, the analyzer 122 of FIG. 1 may generate a weighted value by multiplying the retrieved partial copies count 106 by the quality metric 128, as described with reference to FIG. 1.

The method 700 also includes generating a result value by summing a count of lost packets and the weighted value, at 704. For example, the analyzer 122 of FIG. 1 may generate the result value 118 by summing the count of lost packets 114 and the weighted value, as described with reference to FIG. 1.

The method 700 further includes determining whether the result value is greater than an increment threshold, at 706. For example, the analyzer 122 of FIG. 1 may determine whether the result value 118 satisfies (e.g., is greater than) the increment threshold 136.

The method 700 also includes, in response to determining that the result value is greater than the increment threshold, at 706, determining an increment amount based on a difference between the result value and the increment threshold, at 708. For example, the analyzer 122 of FIG. 1 may, in response to determining that the result value 118 satisfies (e.g., is greater than) the increment threshold 136, determine the increment amount 140 based on a difference between the result value 118 and the increment threshold 136.

The method 700 further includes adjusting an error recovery parameter based on the increment amount, at 710. For example, the analyzer 122 of FIG. 1 may adjust the error recovery parameter 108 based on the increment amount 140, as described with reference to FIG. 1.

The method 700 also includes, in response to determining that the result value is less than or equal to the increment threshold, at 706, determining whether the result value is less than a decrement threshold, at 712. For example, the analyzer 122 of FIG. 1 may, in response to determining that the result value 118 fails to satisfy (e.g., is less than or equal to) the increment threshold 136, determine whether the result value 118 satisfies (e.g., is less than) the decrement threshold 138, as described with reference to FIG. 1.

The method 700 further includes, in response to determining that the result value is greater than or equal to the decrement threshold, at 712, refraining from adjusting the error recovery parameter, at 714. For example, the analyzer 122 of FIG. 1 may, in response to determining that the result value 118 fails to satisfy (e.g., is greater than or equal to) the decrement threshold 138, refrain from adjusting the error recovery parameter 108, as described with reference to FIG. 1.

The method 700 also includes, in response to determining that the result value is less than the decrement threshold, at 712, determining a decrement amount based on a difference between the result value and the decrement threshold, at 716. For example, the analyzer 122 of FIG. 1 may, in response to determining that the result value 118 satisfies (e.g., is less than) the decrement threshold 138, determine the decrement amount 150 based on a difference between the result value 118 and the decrement threshold 138.

The method 700 further includes adjusting the error recovery parameter based on the decrement amount, at 718. For example, the analyzer 122 of FIG. 1 may adjust the error recovery parameter 108 based on the decrement amount 150, as described with reference to FIG. 1.

The method 700 may thus enable dynamic adjustment of an error recovery parameter based on a count of lost packets, a count of retrieved partial copies, or both.

The method 700 of FIG. 7 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 700 of FIG. 7 may be performed by a processor that executes instructions, as described with respect to FIG. 9.

Figure 8:
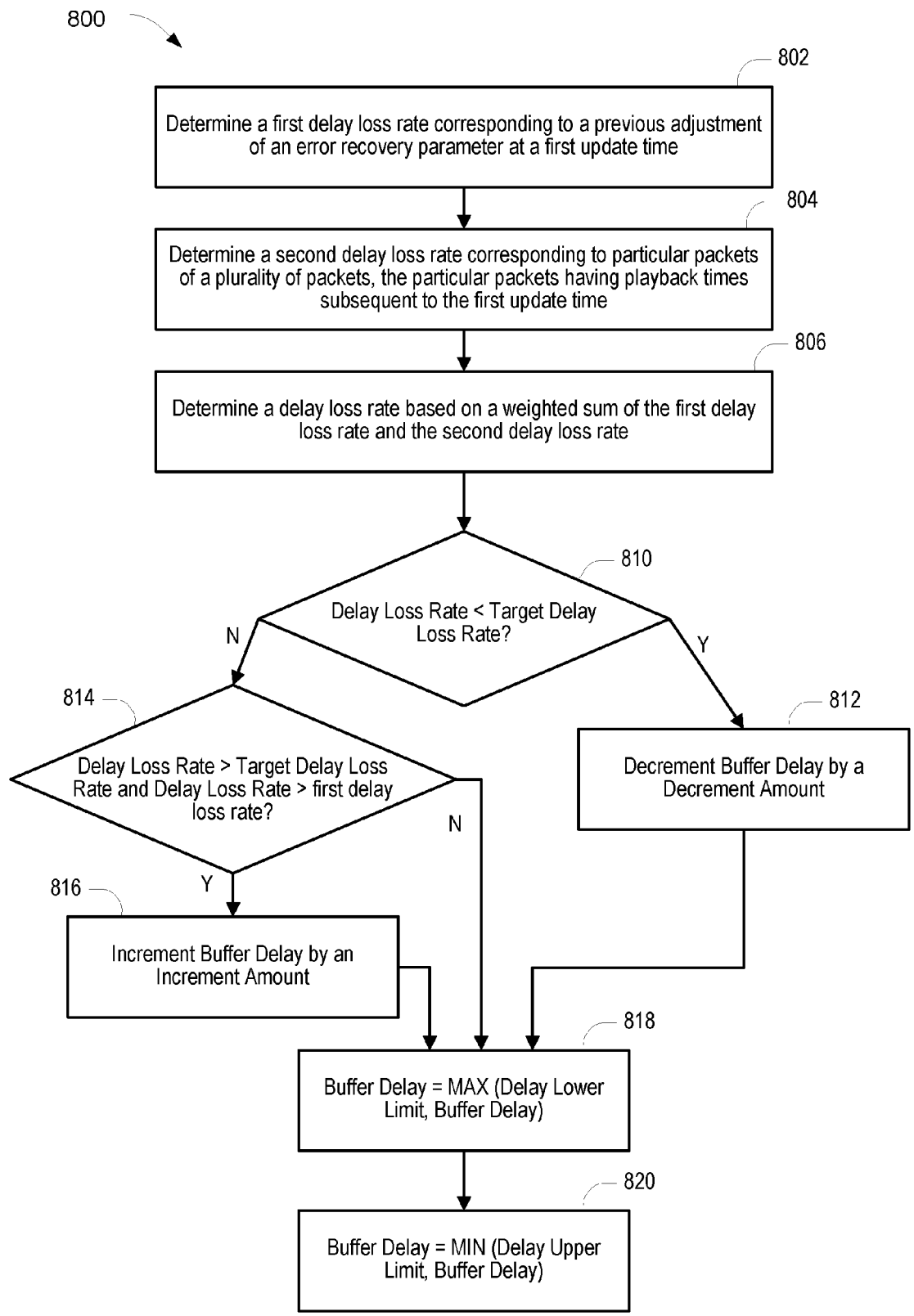
FIG. 8 is a flow chart illustrating another particular method of redundancy based packet transmission error recovery.

Referring to FIG. 8, a flow chart of a particular illustrative aspect of a method of redundancy based packet transmission error recovery is shown and is generally designated 800. In a particular aspect, the method 800 may be executed by the analyzer 122 of FIGS. 1 and 5.

The method 800 includes determining a first delay loss rate corresponding to a previous adjustment of an error recovery parameter at a first update time, at 802. For example, the analyzer 122 may determine the previous delay loss rate 552, as described with reference to FIG. 5. The previous delay loss rate 552 may correspond to a previous adjustment of the error recovery parameter 108 (e.g., the buffer delay 512) at a first update time.

The method 800 also includes determining a second delay loss rate corresponding to particular packets of a plurality of packets, at 804. For example, the analyzer 122 may determine the second delay loss rate 554, as described with reference to FIG. 5. The second delay loss rate 554 may correspond to particular packets of a plurality of packets associated with the input speech signal 130. The particular packets may have playback times subsequent to the first update time.

The method 800 further includes determining a delay loss rate based on a weighted sum of the first delay loss rate and the second delay loss rate, at 806. For example, the analyzer 122 may determine the delay loss rate 556 based on a weighted sum of the previous delay loss rate 552 and the second delay loss rate 554, as described with reference to FIG. 5.

The method 800 also includes determining whether the delay loss rate is lower than a target delay loss rate, at 810. For example, the analyzer 122 may determine whether the delay loss rate 556 is lower than the target delay loss rate 528, as described with reference to FIG. 5.

The method 800 further includes, in response to determining that the delay loss rate is lower than the target delay loss rate, at 810, decrement a buffer delay by a decrement amount, at 812. For example, the analyzer 122 may, in response to determining that the delay loss rate 556 is lower than the target delay loss rate 528, decrease the buffer delay 512 by the decrement amount 516, as described with reference to FIG. 5. The method 800 may proceed to 818.

The method 800 also includes, in response to determining that the delay loss rate is greater than or equal to the target delay loss rate, at 810, determining whether the delay loss rate is greater than the target delay loss rate and whether the delay loss rate is greater than the first delay loss rate, at 814. For example, the analyzer 122 may, in response to determining that the delay loss rate 556 is greater than or equal to the target delay loss rate 528, determine whether the delay loss rate 556 is greater than the target delay loss rate 528 and whether the delay loss rate 556 is greater than the previous delay loss rate 552, as described with reference to FIG. 5. The method 800 may, in response to determining that the delay loss rate is equal to the target delay loss rate or that the delay loss rate is less than or equal to the first delay loss rate, at 814, proceed to 818.

The method 800 further includes, in response to determining that the delay loss rate is greater than the target delay loss rate and that the delay loss rate is greater than the first delay loss rate, at 814, incrementing the buffer delay by an increment amount, at 816. For example, the analyzer 122 may, in response to determining that the delay loss rate 556 is greater than the target delay loss rate 528 and that the delay loss rate 556 is greater than the previous delay loss rate 552, increase the buffer delay 512 by the increment amount 518, as described with reference to FIG. 5. In a particular implementation, the analyzer 122 may, in response to determining that the delay loss rate 556 is greater than the target delay loss rate 528, increase the buffer delay 512 by the increment amount 518.

The method 800 also includes setting the buffer delay to a maximum of a delay lower limit and the buffer delay, at 818. For example, the analyzer 122 may set buffer delay 512 to a maximum of the delay lower limit 538 and the buffer delay 512, as described with reference to FIG. 5.

The method 800 further includes setting the buffer delay to a minimum of a delay upper limit and the buffer delay, at 820. For example, the analyzer 122 may set buffer delay 512 to a minimum of the delay upper limit 536 and the buffer delay 512, as described with reference to FIG. 5.

The method 800 may thus enable dynamic adjustment of an error recovery parameter (e.g., a buffer delay) based on a delay loss rate and a target delay loss rate. The delay loss rate may correspond to a number of delay loss packets relative to a number of received packets. The delay loss packets may include packets that are received subsequent to processing of partial copies of the packets at corresponding playback times. The dynamic adjustment of the buffer delay based on the delay loss rate and the target delay loss rate may provide a balance between having a long buffer delay such that delayed packets are likely to be received prior to corresponding playback times and a short buffer delay that reduces an end-to-end delay associated with a sequence of packets.

The method 800 of FIG. 8 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 800 of FIG. 8 may be performed by a processor that executes instructions, as described with respect to FIG. 9.

Figure 9:
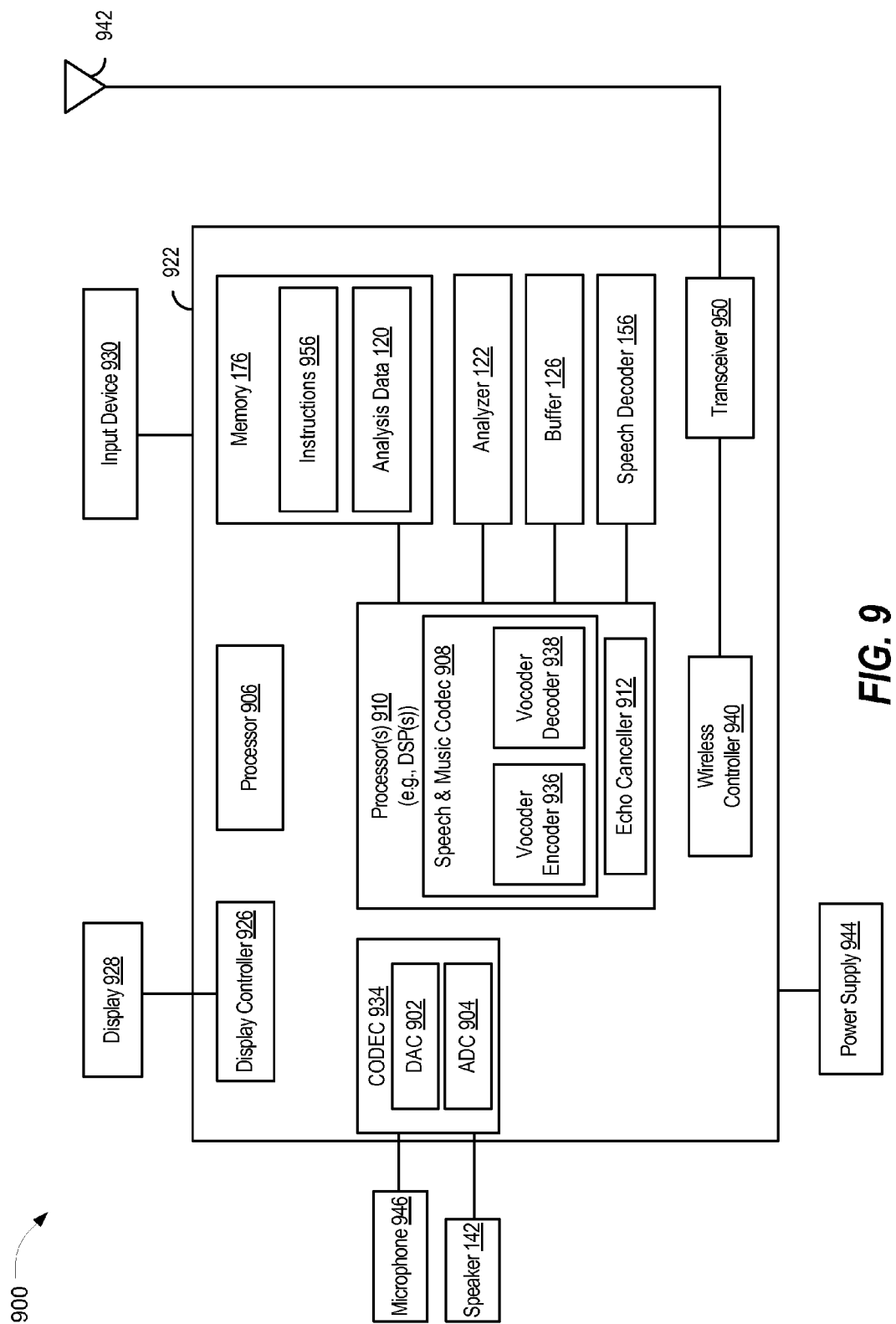
FIG. 9 is a block diagram of a particular illustrative aspect of a device that is operable to perform redundancy based packet transmission error recovery.

Referring to FIG. 9, a block diagram of a particular illustrative aspect of a device (e.g., a wireless communication device) is depicted and generally designated 900. In various aspects, the device 900 may have more or fewer components than illustrated in FIG. 9. In an illustrative aspect, the device 900 may correspond to the destination device 102, the source device 104 of FIG. 1, or both. In an illustrative aspect, the device 900 may perform one or more operations described with reference to FIGS. 1-8.

In a particular aspect, the device 900 includes a processor 906 (e.g., a central processing unit (CPU)). The device 900 may include one or more additional processors 910 (e.g., one or more digital signal processors (DSPs)). The processors 910 may include a speech and music coder-decoder (CODEC) 908 and an echo canceller 912. The speech and music codec 908 may include a vocoder encoder 936, a vocoder decoder 938, or both.

The device 900 may include a memory 176 and a CODEC 934. The memory 176 may include the analysis data 120. The device 900 may include a wireless controller 940 coupled, via a transceiver 950, to an antenna 942. In a particular aspect, the transceiver 950 may include the receiver 124, the transmitter 192, or both, of FIG. 1.

The device 900 may include a display 928 coupled to a display controller 926. The speaker 142 of FIG. 1, the microphone 946, or both, may be coupled to the CODEC 934. The CODEC 934 may include a digital-to-analog converter 902 and an analog-to-digital converter 904. In an illustrative aspect, the microphone 946 may correspond to the microphone 146 of FIG. 1. In a particular aspect, the CODEC 934 may receive analog signals from the microphone 946, convert the analog signals to digital signals using the analog-to-digital converter 904, and provide the digital signals to the speech and music codec 908. The speech and music codec 908 may process the digital signals. In a particular aspect, the speech and music codec 908 may provide digital signals to the CODEC 934. The CODEC 934 may convert the digital signals to analog signals using the digital-to-analog converter 902 and may provide the analog signals to the speaker 142.

The device 900 may include the analyzer 122, the buffer 126, the speech decoder 156, or a combination thereof. In a particular aspect, the analyzer 122, the speech decoder 156, or both, may be included in the processor 906, the processors 910, the CODEC 934, the speech and music codec 908, or a combination thereof. In a particular aspect, the analyzer 122, the speech decoder 156, or both, may be included in the vocoder encoder 936, the vocoder decoder 938, or both. In a particular implementation, the speech decoder 156 may be functionally identical to the vocoder decoder 938. The speech decoder 156 may correspond to dedicated hardware circuitry outside the processors 910 (e.g., the DSPs).

The analyzer 122, the buffer 126, the speech decoder 156, or a combination thereof, may be used to implement a hardware aspect of the redundancy based error recovery technique described herein. Alternatively, or in addition, a software aspect (or combined software/hardware aspect) may be implemented. For example, the memory 176 may include instructions 956 executable by the processors 910 or other processing unit of the device 900 (e.g., the processor 906, the CODEC 934, or both). The instructions 956 may correspond to the analyzer 122, the speech decoder 156, or both.

In a particular aspect, the device 900 may be included in a system-in-package or system-on-chip device 922. In a particular aspect, the analyzer 122, the buffer 126, the speech decoder 156, the memory 176, the processor 906, the processors 910, the display controller 926, the CODEC 934, and the wireless controller 940 are included in a system-in-package or system-on-chip device 922. In a particular aspect, an input device 930 and a power supply 944 are coupled to the system-on-chip device 922. Moreover, in a particular aspect, as illustrated in FIG. 9, the display 928, the input device 930, the speaker 142, the microphone 946, the antenna 942, and the power supply 944 are external to the system-on-chip device 922. In a particular aspect, each of the display 928, the input device 930, the speaker 142, the microphone 946, the antenna 942, and the power supply 944 may be coupled to a component of the system-on-chip device 922, such as an interface or a controller.

The device 900 may include a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof.

In an illustrative aspect, the processors 910 may be operable to perform all or a portion of the methods or operations described with reference to FIGS. 1-8. For example, the microphone 946 may capture an audio signal corresponding to a user speech signal. The ADC 904 may convert the captured audio signal from an analog waveform into a digital waveform comprised of digital audio samples. The processors 910 may process the digital audio samples. A gain adjuster may adjust the digital audio samples. The echo canceller 912 may reduce any echo that may have been created by an output of the speaker 142 entering the microphone 946.

The vocoder encoder 936 may compress digital audio samples corresponding to the processed speech signal and may form a sequence of packets (e.g. a representation of the compressed bits of the digital audio samples). The sequence of packets may be stored in the memory 176. One or more packets of the sequence may include error correction data corresponding to partial copies of other packets of the sequence. The transceiver 950 may modulate some form of each packet (e.g., other information may be appended to the packet) of the sequence and may transmit the modulated data via the antenna 942.

As a further example, the antenna 942 may receive incoming packets corresponding to a sequence of packets sent by another device via a network. The received packets may correspond to a user speech signal. The analyzer 122 may store the incoming packets in the buffer 126 (e.g., a de-jitter buffer). The analyzer 122 may determine whether a next packet to be processed is stored in the buffer 126.

In response to determining that the next packet is stored in the buffer 126, the analyzer 122 may provide the next packet to the vocoder decoder 938. For example, the vocoder decoder 938 may uncompress the next packet. In response to determining that the next packet is not stored in the buffer 126, the analyzer 122 may determine whether a partial copy of the next packet is stored in the buffer 126 as error correction data in another packet. In response to determining that the partial copy is stored in the buffer 126 in the other packet, the analyzer 122 may provide the partial copy or the other packet to the vocoder decoder 938 and may update the retrieved partial copies count 106 of FIG. 1. The vocoder decoder 938 may uncompress the partial copy.

The uncompressed waveform may be referred to as reconstructed audio samples. The echo canceller 912 may remove echo from the reconstructed audio samples. The speech decoder 156 may generate a processed speech signal based on the reconstructed audio samples. A gain adjuster may amplify or suppress the processed speech signal. The DAC 902 may convert the processed speech signal from a digital waveform to an analog waveform and may provide the converted signal to the speaker 142.

In response to determining that neither the next packet nor the partial copy of the next packet is stored in buffer 126, the analyzer 122 may update the count of lost packets 114 of FIG. 1. The analyzer 122 may adjust an error recovery parameter based on the retrieved partial copies count 106, the count of lost packets 114, or both.

In conjunction with the described aspects, an apparatus may include means for receiving a plurality of packets. The plurality of packets may correspond to at least a subset of a sequence of packets. The plurality of packets may include error correction data. The error correction data of a first packet of the plurality of packets may include a partial copy of a second packet of the plurality of packets. For example, the means for receiving the plurality of packets may include the receiver 124 of FIG. 1, the transceiver 950, or both.

The apparatus may also include means for error recovery. The means for error recovery may be configured to determine whether a particular packet of the sequence of packets is missing from a buffer, to determine whether a partial copy of the particular packet is stored in the buffer as error correction data in another packet, and to send a retransmit message to a second device based at least in part on determining that the buffer does not store the particular packet and that the buffer does not store the partial copy of the particular packet. For example, the means for error recovery may include the analyzer 122, the processor 906, the processors 910, the CODEC 934, or a combination thereof.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein and is to be accorded the widest scope possible consistent with the principles and novel features as defined by the following claims.

What is claimed is:

1. A device comprising:
a receiver configured to receive a plurality of packets, the plurality of packets corresponding to at least a subset of a sequence of packets;
a buffer configured to store the plurality of packets;
an analyzer configured to:
determine whether a particular packet of the sequence of packets is missing from the buffer;
determine whether a partial copy of the particular packet is stored in the buffer as error correction data in another packet;
initiate transmission of a retransmit message to a second device based at least in part on a determination that the buffer does not store the particular packet, that the buffer does not store the partial copy of the particular packet, and that a retransmission count satisfies a retransmission threshold; and
update the retransmission count subsequent to transmission of the retransmit message to the second device;
a speech decoder configured to decode a retransmitted version of the particular packet to generate a decoded packet, the retransmitted version of the particular packet received in response to transmission of the retransmit message; and
one or more speakers configured to output audio based on the decoded packet.

2. The device of claim 1, wherein the retransmit message requests retransmission of the particular packet.

3. The device of claim 1, further comprising a transmitter configured to transmit the retransmit message to the second device, wherein the receiver and the transmitter are included in a transceiver.

4. The device of claim 1, wherein the analyzer is further configured to update the retransmission threshold based on determining whether the particular packet is missing from the buffer and whether the partial copy of the particular packet is stored in the buffer.

5. The device of claim 1, wherein the analyzer is further configured to:
update a count of retrieved partial copies in response to determining that the particular packet is missing from the buffer and that the partial copy of the particular packet is stored in the buffer; and
update the retransmission threshold based at least in part on the count of retrieved partial copies.

6. The device of claim 5, wherein the analyzer is further configured to update a count of lost packets in response to determining that the buffer does not store the particular packet and does not store the partial copy of the particular packet, and wherein the retransmission threshold is updated based at least in part on the count of lost packets.

7. The device of claim 6, wherein the analyzer is further configured to determine a result value based on the count of retrieved partial copies and the count of lost packets, and wherein the retransmission threshold is increased by an increment amount in response to determining that the result value satisfies an increment threshold.

8. The device of claim 6, wherein the analyzer is further configured to determine a result value based on the count of retrieved partial copies and the count of lost packets, and wherein the retransmission threshold is decreased by an decrement amount in response to determining that the result value satisfies a decrement threshold.

9. The device of claim 6, wherein the analyzer is further configured to:
generate a weighted value by multiplying the count of retrieved partial copies by a quality metric; and
determine a result value based on a sum of the count of lost packets and the weighted value,
wherein the retransmission threshold is updated based on determining whether the result value satisfies a threshold.

10. A method of communication comprising:
receiving a plurality of packets at a device, the plurality of packets corresponding to at least a subset of a sequence of packets;
determining, at the device, whether a particular packet of the sequence of packets is missing from a buffer;
determining, at the device, whether a partial copy of the particular packet is stored in the buffer as error correction data in another packet;

sending a retransmit message from the device to a second device based at least in part on determining that the buffer does not store the particular packet, that the buffer does not store the partial copy of the particular packet, and that a retransmission count satisfies a retransmission threshold;

updating the retransmission count subsequent to sending the retransmit message to the second device;

decoding a retransmitted version of the particular packet to generate a decoded packet, the retransmitted version of the particular packet received in response to transmission of the retransmit message; and outputting audio based on the decoded packet.

11. The method of claim 10, further comprising:
updating, at the device, the retransmission threshold based on determining whether the particular packet is missing from the buffer and whether the partial copy of the particular packet is stored in the buffer.

12. The method of claim 10, further comprising:
updating, at the device, a count of retrieved partial copies in response to determining that the particular packet is missing from the buffer and that the partial copy of the particular packet is stored in the buffer;
updating, at the device, a count of lost packets in response to determining that the buffer does not store the particular packet and does not store the partial copy of the particular packet; and
updating the retransmission threshold based on the count of retrieved partial copies and the count of lost packets.

13. The method of claim 12, further comprising:
determining a weighted value by multiplying the count of retrieved partial copies by a quality metric; and
determine a result value based on a sum of the count of lost packets and the weighted value,
wherein the retransmission threshold is increased by an increment amount in response to determining that the result value satisfies an increment threshold.

14. The method of claim 13, further comprising determining the increment amount based on a difference between the result value and the increment threshold.

15. The method of claim 12, further comprising:
determining a weighted value by multiplying the count of retrieved partial copies by a quality metric; and
determine a result value based on a sum of the count of lost packets and the weighted value,
wherein the retransmission threshold is decreased by an decrement amount in response to determining that the result value satisfies a decrement threshold.

16. The method of claim 15, further comprising determining the decrement amount based on a difference between the result value and the decrement threshold.

17. A computer-readable storage device storing instructions that, when executed by a processor, cause the processor to perform operations comprising:
receiving a plurality of packets, the plurality of packets corresponding to at least a subset of a sequence of packets;
determining whether a particular packet of the sequence of packets is missing from a buffer;
determining whether a partial copy of the particular packet is stored in the buffer as error correction data in another packet;
initiating transmission of retransmit message to a device based at least in part on determining that the buffer does not store the particular packet, that the buffer does not store the partial copy of the particular packet, and that a retransmission count satisfies a retransmission threshold;

updating the retransmission count subsequent to transmission of the retransmit message to the device;

decoding a retransmitted version of the particular packet to generate a decoded packet, the retransmitted version of the particular packet received in response to transmission of the retransmit message; and outputting audio based on the decoded packet.

18. The computer-readable storage device of claim 17, wherein the operations further comprise refraining from sending the retransmit message to the device in response to determining that the buffer stores the particular packet, that the buffer stores the partial copy of the particular packet, that a retransmission count fails to satisfy a retransmission threshold, or a combination thereof.

19. The computer-readable storage device of claim 17, wherein the operations further comprise updating the retransmission threshold based on determining whether the particular packet is missing from the buffer and whether the partial copy of the particular packet is stored in the buffer, and wherein the particular packet includes speech data.

20. The computer-readable storage device of claim 17, wherein the operations further comprise:
updating a count of retrieved partial copies in response to determining that the particular packet is missing from the buffer and that the partial copy of the particular packet is stored in the buffer;
updating a count of lost packets in response to determining that the buffer does not store the particular packet and does not store the partial copy of the particular packet; and
updating the retransmission threshold based on the count of retrieved partial copies and the count of lost packets.

21. The computer-readable storage device of claim 20, wherein the operations further comprise:
determining a weighted value by multiplying the count of retrieved partial copies by a quality metric; and
determining a result value based on a sum of the count of lost packets and the weighted value, wherein the retransmission threshold is updated based on the result value.

22. The computer-readable storage device of claim 17, wherein the operations further comprise:
determining a result value based on whether the particular packet is missing from the buffer and whether the partial copy of the particular packet is stored in the buffer; and
in response to determining that the result value satisfies an increment threshold:
determining an increment amount based on a difference between the result value and the increment threshold; and
increasing the retransmission threshold based on the increment amount.

23. The computer-readable storage device of claim 17, wherein the operations further comprise:
determining a result value based on whether the particular packet is missing from the buffer and whether the partial copy of the particular packet is stored in the buffer; and
in response to determining that the result value satisfies a decrement threshold, decreasing the retransmission threshold based on a decrement amount.

24. The computer-readable storage device of claim 23, wherein the operations further comprise determining the decrement amount based on a difference between the result value and the decrement threshold.

25. The computer-readable storage device of claim 17, wherein the plurality of packets includes error correction data, wherein the error correction data of a first packet of the plurality of packets includes a partial copy of a second packet of the plurality of packets, and wherein the second packet is earlier in the sequence of packets than the first packet.

26. An apparatus comprising:
  means for receiving a plurality of packets, the plurality of packets corresponding to at least a subset of a sequence of packets;
  means for error recovery, the means for error recovery configured to:
    determine whether a particular packet of the sequence of packets is missing from a buffer; and
    determine whether a partial copy of the particular packet is stored in the buffer as error correction data in another packet;
  means for sending a retransmit message to a second device based at least in part on determining that the buffer does not store the particular packet, that the buffer does not store the partial copy of the particular packet, and that a retransmission count satisfies a retransmission threshold;
  means for updating the retransmission count subsequent to sending the retransmit message to the second device;
  means for decoding a retransmitted version of the particular packet to generate a decoded packet, the retransmitted version of the particular packet received in response to transmission of the retransmit message; and
  means for outputting audio based on the decoded packet.

27. The apparatus of claim 26, wherein the means for receiving, the means for error recovery, the means for sending, the means for decoding, and the means for outputting are integrated into a decoder, a set top box, a music player, a video player, an entertainment unit, a navigation device, a communications device, a personal digital assistant (PDA), or a computer.

\* \* \* \* \*